US012347227B2

(12) United States Patent
Zhang et al.

(10) Patent No.: US 12,347,227 B2
(45) Date of Patent: Jul. 1, 2025

(54) PALM PRINT RECOGNITION METHOD, METHOD FOR TRAINING FEATURE EXTRACTION MODEL, COMPRISING OBTAINING SAMPLE HAND IMAGES FOR USER IDENTIFIERS, CALLING FEATURE EXTRACTION MODEL TO EXTRACT PALM PRINT FEATURES, AND ADJUST THE FEATURE EXTRACTION MODEL ACCORDING TO THE SAMPLE PALM PRINT FEATURES

(71) Applicant: Tencent Technology (Shenzhen) Company Limited, Shenzhen (CN)

(72) Inventors: Ruixin Zhang, Shenzhen (CN); Jilin Li, Shenzhen (CN); Shaoxin Li, Shenzhen (CN); Yuge Huang, Shenzhen (CN); Yingyi Zhang, Shenzhen (CN); Lei Shen, Shenzhen (CN); Feiyue Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 393 days.

(21) Appl. No.: 17/744,096

(22) Filed: May 13, 2022

(65) Prior Publication Data
US 2022/0270396 A1 Aug. 25, 2022

Related U.S. Application Data

(63) Continuation of application No. PCT/CN2021/098286, filed on Jun. 4, 2021.

(30) Foreign Application Priority Data

Jul. 9, 2020 (CN) .......................... 202010659354.2

(51) Int. Cl.
*G06V 40/12* (2022.01)
*G06T 5/50* (2006.01)
*G06N 20/00* (2019.01)

(52) U.S. Cl.
CPC ............ *G06V 40/1347* (2022.01); *G06T 5/50* (2013.01); *G06V 40/1335* (2022.01); *G06T 2207/20081* (2013.01); *G06T 2207/20221* (2013.01)

(58) Field of Classification Search
CPC .......... G06N 20/00; G06T 2207/20081; G06T 2207/20221; G06T 5/50; G06V 40/1335; G06V 40/1347; G06V 40/1365
(Continued)

(56) References Cited

U.S. PATENT DOCUMENTS

2008/0056539 A1* 3/2008 Sweeney ............ G06V 40/1312
382/115
2014/0366113 A1* 12/2014 LeCun .................... H04L 63/10
726/7
(Continued)

FOREIGN PATENT DOCUMENTS

CN 108416338 A 8/2018
CN 109345553 A 2/2019
(Continued)

OTHER PUBLICATIONS

Gao et al. Deep Learning in Palmprint Recognition—A Comprehensive Survey, Jan. 2, 2025, Pertinent pp. 1-14. (Year: 2025)*
(Continued)

*Primary Examiner* — Chad Dickerson
(74) *Attorney, Agent, or Firm* — Crowell & Moring LLP

(57) ABSTRACT

Embodiments of this application disclose a palm print recognition method, a method for training a feature extraction model, a device, and a storage medium, and belong to
(Continued)

the field of computer technologies. The method includes: obtaining sample hand images for each of a plurality of sample user identifiers, at least two of the sample hand images associated with the each of the plurality of sample user identifier being acquired from image acquisition devices having different image acquisition characteristics; calling a feature extraction model to extract sample palm print features of the plurality of sample user identifiers; and adjusting the feature extraction model according to the sample palm print features of the plurality of sample user identifiers.

18 Claims, 18 Drawing Sheets

(58) Field of Classification Search
USPC .................................................. 382/209, 190
See application file for complete search history.

(56) References Cited

U.S. PATENT DOCUMENTS

2015/0347833 A1* 12/2015 Robinson ............... G01B 11/25
348/49

2017/0367685 A1   12/2017  Zou et al.
2020/0143137 A1*  5/2020  Gottemukkula ......... G06N 3/04

FOREIGN PATENT DOCUMENTS

| CN | 110263632 A | * | 9/2019 | |
| CN | 110516734 A | * | 11/2019 | ........... G06K 9/6204 |
| CN | 110852216 A |   | 2/2020 | |
| CN | 111178403 A |   | 5/2020 | |
| WO | WO 2020/088469 A1 | | 5/2020 | |

OTHER PUBLICATIONS

Sweeney et al. Hand Shot ID: A Fast 3-D Imaging System for Capturing Fingerprints, Palm Prints and Hand Geometry. Carnegie Mellon University and Duquesne University. 2004. Pertinent pp. 3-19. (Year: 2004).*

International Search Report and Written Opinion with English Translation for International Application No. PCT/CN2021/098286 dated Aug. 30, 2021, 12 pgs.

Chinese Office Action with English Translation of Concise Explanation of Relevance for Chinese Patent Application No. 202010659354.2 dated Jan. 5, 2023, 11 pages.

Fangjie Xu, et al., "Pedestrian Re-identification Based on Deep Learning and Attributes Learning", Journal of Data Acquisition and Processing vol. 33, No. 4, Jul. 15, 2018, 7 pages.

* cited by examiner (1)　　　　　(2)　　　　　(3)　　　　　(4)

(5)　　　　　(6)　　　　　(7)　　　　　(8)

PALM PRINT RECOGNITION METHOD, METHOD FOR TRAINING FEATURE EXTRACTION MODEL, COMPRISING OBTAINING SAMPLE HAND IMAGES FOR USER IDENTIFIERS, CALLING FEATURE EXTRACTION MODEL TO EXTRACT PALM PRINT FEATURES, AND ADJUST THE FEATURE EXTRACTION MODEL ACCORDING TO THE SAMPLE PALM PRINT FEATURES

RELATED APPLICATION

This application is a continuation application of PCT Patent Application No. PCT/CN2021/098286, filed on Jun. 4, 2021, which claims priority to Chinese Patent Application No. 202010659354.2, filed with the China National Intellectual Property Administration on Jul. 9, 2020, each of which is incorporated by reference in its entirety.

FIELD OF THE TECHNOLOGY

Embodiments of this application relate to the field of computer technologies, and in particular, to a palm print (or palmprint) recognition technology.

BACKGROUND OF THE DISCLOSURE

With the development of computer technologies, the palm print recognition technology is increasingly widely applied. Since palm prints in a palm of a user is a biometric feature with uniqueness, the user may be authenticated through the palm prints of the user.

A palm print recognition method is provided in the related art, to obtain a hand image to be verified, and encode the hand image to obtain an image feature of the hand image. The image feature may include a palm print feature. A feature recognition model is called to recognize the image feature to determine a user identifier of the hand image. The foregoing method has high requirements on the quality of the hand image and a narrow application range. In addition, accuracy of the encoded image feature is poor, resulting in poor accuracy of the determined user identifier.

SUMMARY

According to an aspect, an embodiment of this disclosure provides a palm print recognition method, performed by a computer device, the method including:

obtaining a target hand image, the target hand image including a palm;

calling a feature extraction model to perform feature extraction according to the target hand image, to obtain a target palm print feature, the feature extraction model being obtained through training according to sample palm print features of a plurality of sample user identifiers, each sample user identifier including a plurality of sample palm print features, the plurality of sample palm print features being obtained by respectively performing feature extraction on a plurality of corresponding sample hand images of the sample user identifier, and a plurality of sample hand images of a same sample user identifier being acquired by using different types of devices; and performing recognition processing on the target palm print feature according to a plurality of preset palm print features stored and user identifiers corresponding to the preset palm print features, to determine a target user identifier of the target palm print feature.

According to another aspect, a method for training a feature extraction model is provided, performed by a computer device, the method including:

obtaining sample hand images of a plurality of sample user identifiers, a plurality of sample hand images of a same sample user identifier being acquired by using different types of devices;

calling a feature extraction model to perform feature extraction according to the sample hand images, to obtain sample palm print features; and training the feature extraction model according to the sample palm print features of the plurality of sample user identifiers.

According to another aspect, a palm print recognition apparatus corresponding to the foregoing palm print recognition method, an apparatus for training a feature extraction model corresponding to the foregoing method for training a feature extraction model, and computer devices and corresponding non-transitory computer-readable storage mediums, computer program products or computer programs of the model training method that can perform the palm print recognition method and the method for training a feature extraction model are provided.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from the accompanying drawings without creative efforts.

DESCRIPTION OF EMBODIMENTS

To make objectives, technical solutions, and advantages of the embodiments of this disclosure clearer, the following further describes in detail implementations of this application with reference to the accompanying drawings.

It may be understood that, the terms "first", "second", "third", "fourth", and the like used in this application may be used for describing various concepts in this specification. However, the concepts are not limited by the terms unless otherwise specified. The terms are merely used for distinguishing one concept from another concept. For example, without departing from the scope of this application, a first preset value may be referred to as a second preset value, and similarly, the second preset value may be referred to as the first preset value.

For the terms "at least one", "a plurality of", "each", and "any" used in this application, "at least one" refers to "one", "two", or "more", "a plurality of" refers to "two" or "more", "each" refers to "each of a plurality of corresponding", and "any" refers to "any one of a plurality of". For example, when "a plurality of palm images" refers to "three palm images", "each" refers to "each of the three palm images", and "any" refers to "any one of the three palm images", that is, may be the first palm image, the second palm image, or the third palm image.

The solutions provided in the embodiments of this disclosure, based on the machine learning technology of artificial intelligence, can train a palm extraction model and a feature extraction model. A palm print feature of a hand image is then obtained by using the trained palm extraction model and feature extraction model, and a user identifier may be subsequently determined according to the obtained palm print feature, thereby identifying the identity of the user to which the hand image belongs.

The palm print recognition method provided in the embodiments of this disclosure may be used in a computer device, where the computer device includes a terminal or a server. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

Figure 1:
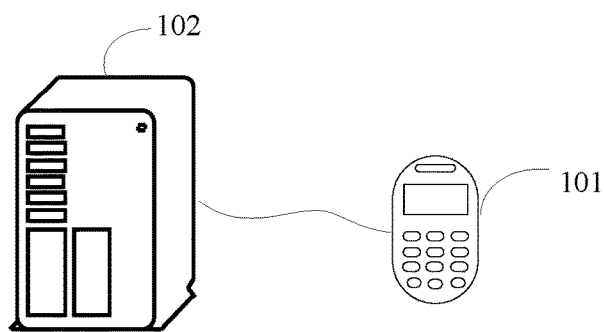
FIG. 1 is a schematic structural diagram of an implementation environment according to an embodiment of this disclosure.

FIG. 1 is a schematic structural diagram of an implementation environment according to an embodiment of this disclosure. Referring to FIG. 1, the implementation environment includes a terminal 101 and a server 102. The terminal 101 establishes a communication connection with the server 102, and interacts through the established communication connection.

The terminal 101 obtains a target hand image, and sends the target hand image to the server 102. After receiving the target hand image, the server 102 calls a feature extraction model to perform feature extraction according to the target hand image, to obtain a target palm print feature. Further, recognition processing is performed on the target palm print feature according to a plurality of preset palm print features stored and user identifiers corresponding to the preset palm print features, to determine a target user identifier of the target palm print feature, and send the target user identifier to the terminal 101.

The method provided in this embodiment of this disclosure may be used in an identity verification scenario.

For example, in a smart payment scenario:

A terminal of a merchant obtains a hand image of a user by photographing a palm of the user, uses the palm print recognition method provided in this embodiment of this disclosure to determine a target user identifier of the hand image, and transfers some resources in a resource account corresponding to the target user identifier to a resource account of the merchant, thereby implementing automatic payment through the palm.

In another example, in a cross-device payment scenario:

The user may use a personal mobile phone to complete identity registration at home or other private spaces, and bind the account of the user with a palm print feature of the user. The user may then go to an in-store device to identify the palm print feature of the user, determine the account of the user, and pay directly through this account.

In another example, in a work or office check-in scenario:

The terminal obtains a hand image of a user by photographing a palm of the user, uses the palm print recognition method provided in this embodiment of this disclosure to determine a target user identifier of the hand image, and establishes a check-in mark for the target user identifier, to determine that the target user identifier has completed work check-in at the current time.

Figure 2:
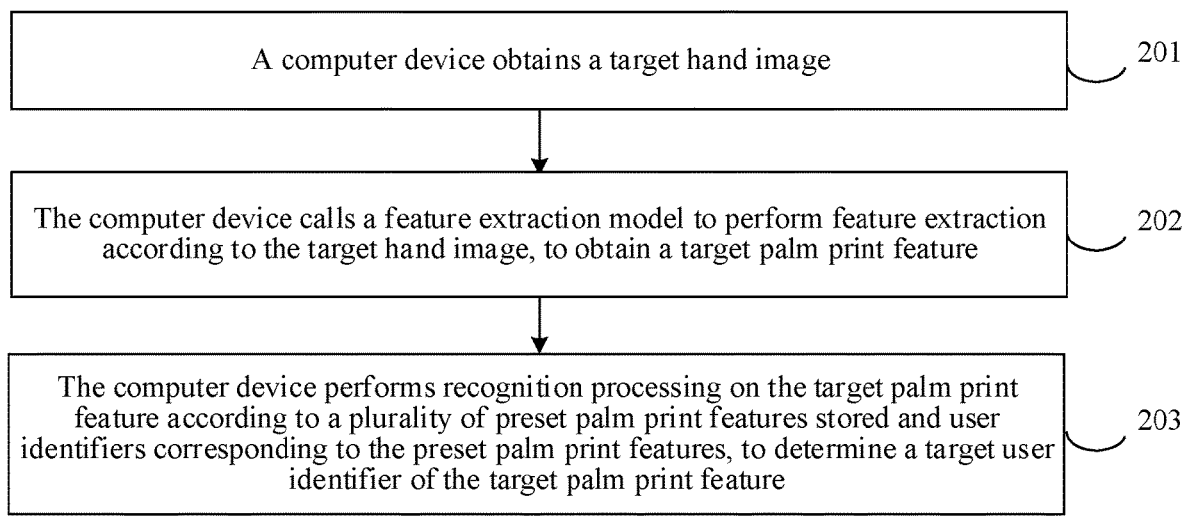
FIG. 2 is a flowchart of a palm print recognition method according to an embodiment of this disclosure.

FIG. 2 is a flowchart of a palm print recognition method according to an embodiment of this disclosure. The method is applicable to a computer device. As shown in FIG. 2, the method includes:

201: A computer device obtains a target hand image.

The target hand image is a hand image of a user identifier to be determined, the target hand image includes a palm, the palm is a palm of a user whose identity is to be verified, and the target hand image may further include other information, such as a finger of the user and a scene in which the palm of the user is captured. The target hand image may be obtained by photographing the palm of the user whose identity is to be verified by the computer device, or may be sent by other devices. For example, the computer device is a store payment device, and the store payment device captures the palm of the user through a camera to obtain the target hand image. Alternatively, the computer device is a palm print recognition server. After capturing the target hand image, the store payment device sends the target hand image to the palm print recognition server.

202. The computer device calls a feature extraction model to perform feature extraction according to the target hand image, to obtain a target palm print feature.

The target palm print feature is used to represent a feature of the palm included in the target hand image, and the target palm print feature may be represented by a vector or in other forms. Since palm prints in palms of different users are different and the palm prints are unique, palm print features of the palms of different users are different.

The feature extraction model is a model for extracting palm print features, and the feature extraction model is obtained by training a plurality of sample hand images. When the feature extraction model is trained, sample hand images of a plurality of sample user identifiers are obtained, feature extraction is performed on the plurality of sample hand images by calling the feature extraction model to obtain a plurality of sample palm print features, and the feature extraction model is trained according to the sample palm print features of the plurality of sample user identifiers, thereby obtaining a trained feature extraction model. Each sample user identifier includes a plurality of sample palm print features, and a plurality of sample hand images of a same sample user identifier is acquired by using different types of devices.

Since the quality of sample hand images acquired by different types of devices is different, there may be sample hand images with high definition, and sample hand images with low definition. Therefore, the feature extraction model is trained according to sample hand images acquired by different types of devices (i.e., devices supporting different image quality/definition), so that the trained feature extraction model can perform feature extraction on the sample hand images acquired by different types of devices, thereby having a wide range of application, improving the accuracy of obtained palm print features, and subsequently improving the accuracy of determined user identifiers.

The feature extraction model is called to perform feature extraction on a target palm image, so that a target palm print feature of a palm included in the target palm image can be obtained, which is convenient for subsequent determination of a user identifier corresponding to the target palm image.

In addition to the palm, the target hand image obtained by the computer device may further include other information, such as a finger of the user and a shooting scene. Therefore, to avoid the impact of other information in the target hand image, the palm in the target hand image is highlighted, to improve the accuracy of the palm print feature obtained subsequently. In a possible implementation, the implementation of S202 may be that the computer device performs palm extraction on the target hand image to obtain a target palm image of the target hand image, and then calls the feature extraction model to perform feature extraction on the target palm image, to obtain a target palm print feature.

The target palm image only includes the palm portion in the target hand image, and may be a partial image of the target hand image.

In a possible implementation, the palm extraction model may be used for palm extraction, so that the target palm image of the target hand image only includes the palm, which avoids the impact of other information in the target hand image, highlights the palm in the target palm image, and improves the accuracy of the palm print feature obtained subsequently.

203: The computer device performs recognition processing on the target palm print feature according to a plurality of preset palm print features stored and user identifiers corresponding to the preset palm print features, to determine a target user identifier of the target palm print feature.

The preset palm print feature is a palm print feature of the palm whose user identifier is known. Each preset palm print feature has a corresponding user identifier, indicating that the preset palm print feature belongs to the user identifier and is a palm print feature of the palm of the user. The user identifier may be any type of user identifier, for example, the user identifier is a user identifier registered in a payment application, or the user identifier is a user identifier registered in an enterprise.

In this embodiment of this disclosure, the computer device may include a preset database, where the preset database includes a plurality of preset palm print features, and a user identifier corresponding to each preset palm print feature. In the preset database, preset palm print features and user identifiers may be in one-to-one correspondence, or one user identifier may correspond to at least two preset palm print features.

For example, when a plurality of users register in a payment application, a palm print feature of each user is bound with a corresponding user identifier, and the palm print features of the plurality of users and the corresponding user identifiers are stored in the database. When a user uses the payment application subsequently, a target user identifier is determined through an obtained target palm feature and the preset palm print features in the database, to implement identity verification of the user.

In the method provided in this embodiment of this disclosure, when palm print recognition is performed, a target hand image including a palm is obtained, and a feature extraction model is called to perform feature extraction according to the target hand image, to obtain a target palm print feature, so that a corresponding user identifier can be precisely determined according to the obtained palm print feature. Since the sample hand images used in training the feature extraction model are acquired by different types of devices, the feature extraction model can adapt to hand images acquired by various types of devices, and has a wide range of application. In addition, the trained feature extraction model can accurately perform feature extraction on hand images captured by various types of devices, which improves the robustness of the feature extraction model.

Figure 3:
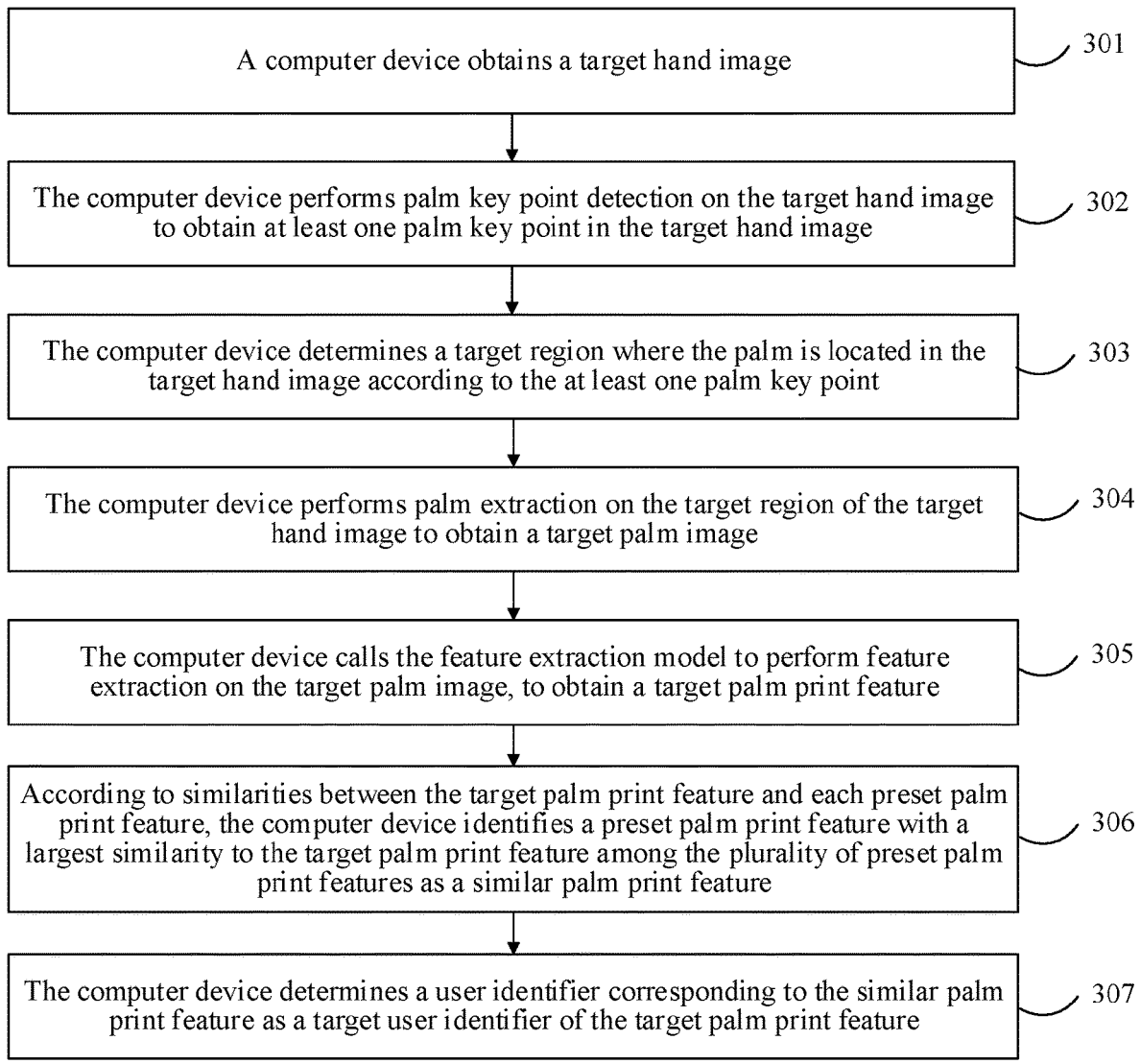
FIG. 3 is a flowchart of a palm print recognition method according to an embodiment of this disclosure.

FIG. 3 is a flowchart of a palm print recognition method according to an embodiment of this disclosure. The method is applicable to a computer device. As shown in FIG. 3, the method includes:

301: A computer device obtains a target hand image.

In a possible implementation, step 301 may include that: the computer device photographs a palm of a user to obtain a target hand image. The target hand image includes the palm, and the palm may be a left palm or right palm of the user. For example, the computer device is an Internet of Things device. The Internet of Things device captures the left palm of the user through a camera to obtain the target hand image, and the Internet of Things device may be a palm print payment terminal, a merchant payment terminal, or the like. In another example, when the user performs a transaction in a store, the user stretches the palm to a camera of a payment terminal of the store, and the payment terminal of the store captures the palm through the camera to obtain the target hand image.

In another possible implementation, step 301 may include that: the computer device establishes a communication connection with another device, and receives the target hand image sent by the another device through the communication connection. For example, the computer device is a payment application server, and the another device may be a payment terminal. After the payment terminal captures the palm of the user and obtains the target hand image, through the communication connection between the payment terminal and the payment application server, the target hand image is sent to the payment application server, to enable the payment application server to determine a user identifier of the target hand image.

302: The computer device performs palm key point detection on the target hand image to obtain at least one palm key point in the target hand image.

The palm key point may be any point of the palm, for example, the palm key point may include a gap key point between an index finger and a middle finger, or the palm key point may include a gap key point between the middle finger and a ring finger, or the palm key point is a gap key point between the ring finger and a little finger.

Since the palm may exist in any region in the target hand image, to determine a position of the palm in the target hand image, palm key point detection is performed on the target hand image to obtain at least one palm key point of the target hand image, so that the region where the palm is located can be determined subsequently according to the at least one palm key point.

In a possible implementation, step 302 may include: performing palm key point detection on the target hand image to obtain coordinates of at least one palm key point in the target hand image.

For example, in the target hand image, a coordinate system is established with an upper left corner of the target hand image as an origin, or a coordinate system is established with a center point of the target hand image as the origin. After at least one palm key point is detected, coordinates of the at least one palm key point in the coordinate system can be determined.

303: The computer device determines a target region where the palm is located in the target hand image according to the at least one palm key point.

The target region is a region covering the palm in the target hand image, and the target region may be a region of any shape, for example, a circular region or a square region. Since the palm key point is a point in the palm, the target region where the palm is located in the target hand image may be determined through the determined at least one palm key point, and a palm image may be subsequently extracted through the target region.

Figure 4:
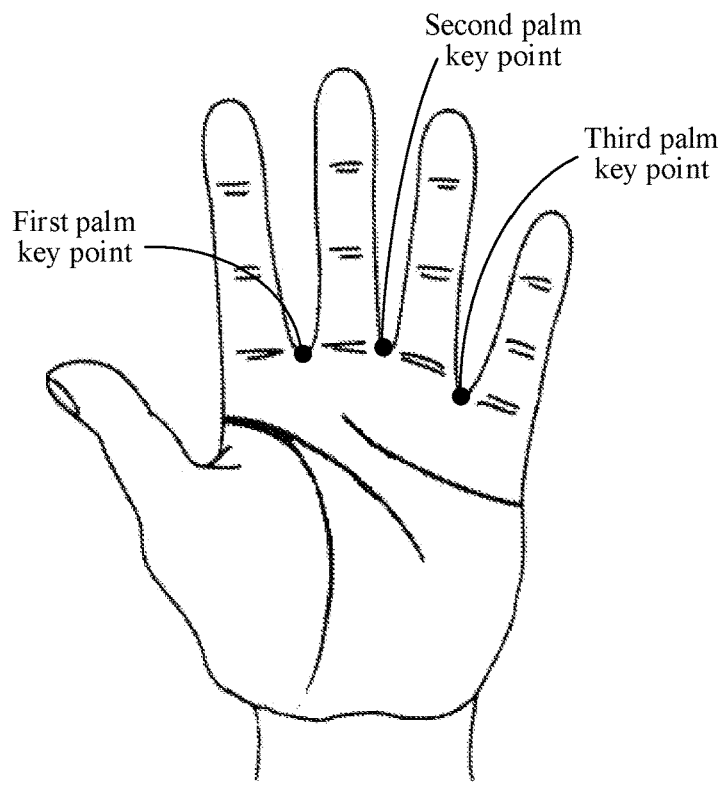
FIG. 4 is a schematic diagram of a position of a palm key point according to an embodiment of this disclosure.

In a possible implementation, the at least one palm key point includes a first palm key point, a second palm key point, and a third palm key point, and the second palm key point is located between the first palm key point and the third palm key point. The distribution positions of the first palm key point, the second palm key point, and the third palm key point in the palm are shown in FIG. 4. Step 303 may include the following steps 3031 to 3035:

3031: The computer device uses a product of a distance between the first palm key point and the third palm key point and a third preset value as a first distance.

In this embodiment of this disclosure, a fourth palm key point may be used as a center point of the palm, which integrates a relative position of the first palm key point, the second palm key point, the third palm key point, and the fourth palm key point in the palm of the ordinary person. Generally, the fourth palm key point and the second palm key point are on a straight line, and the straight line formed by the fourth palm key point and the second palm key point is perpendicular to a straight line formed by the first palm key point and the third palm key point. For example, the first palm key point is the gap key point between the index finger and the middle finger, the second palm key point is the gap key point between the middle finger and the ring finger, the third palm key point is the gap key point between the ring finger and the little finger, and the fourth palm key point is the center point of the palm. In the palm of the ordinary person, a straight line formed by the gap key point between the index finger and the middle finger, and the gap key point between the ring finger and the little finger is perpendicular to a straight line formed by the gap key point between the middle finger and the ring finger, and the center point of the palm. In addition, a ratio of a distance between the first palm key point and the third palm key point to a distance between the fourth palm key point and the second palm key point of the ordinary person is integrated, to estimate the third preset value. That is, in the palm of the ordinary person, there is a proportional relationship between the distance between the first palm key point and the third palm key point and the first distance between the fourth palm key point and the second palm key point. After the distance between the first palm key point and the third palm key point is determined, according to the existing proportional relationship, the first distance between the second palm key point and the fourth palm key point can be determined. After the first palm key point, the second palm key point, and the third palm key point are detected subsequently, the center point of the palm, that is, the fourth palm key point can be determined.

The third preset value may be any value, such as 1.5 or 2. After determining the first palm key point and the third palm key point in the target hand image, the computer device may determine a distance between the first palm key point and the third palm key point, and use a product of the distance and the third preset value as a first distance. The first distance represents the distance between the second palm key point and the fourth palm key point, and the fourth palm key point may be determined through the first distance subsequently.

In a possible implementation, step 3031 may include: determining a distance between the first palm key point and the third palm key point according to coordinates of the first palm key point and coordinates of the third palm key point, and using a product of the distance and a third preset value as a first distance.

When performing key point detection on the target hand image, the computer device may determine coordinates of each palm key point in the target hand image. Therefore, the distance between the first palm key point and the third palm key point can be determined through the coordinates of the first palm key point and the coordinates of the third palm key point.

3032: The computer device determines a fourth palm key point according to the first distance.

The fourth palm key point may be used to represent the center point of the palm. The distance between the fourth palm key point and the second palm key point is equal to the first distance, and the straight line formed by the first palm key point and the third palm key point is perpendicular to the straight line formed by the second palm key point and the fourth palm key point.

Figure 5:
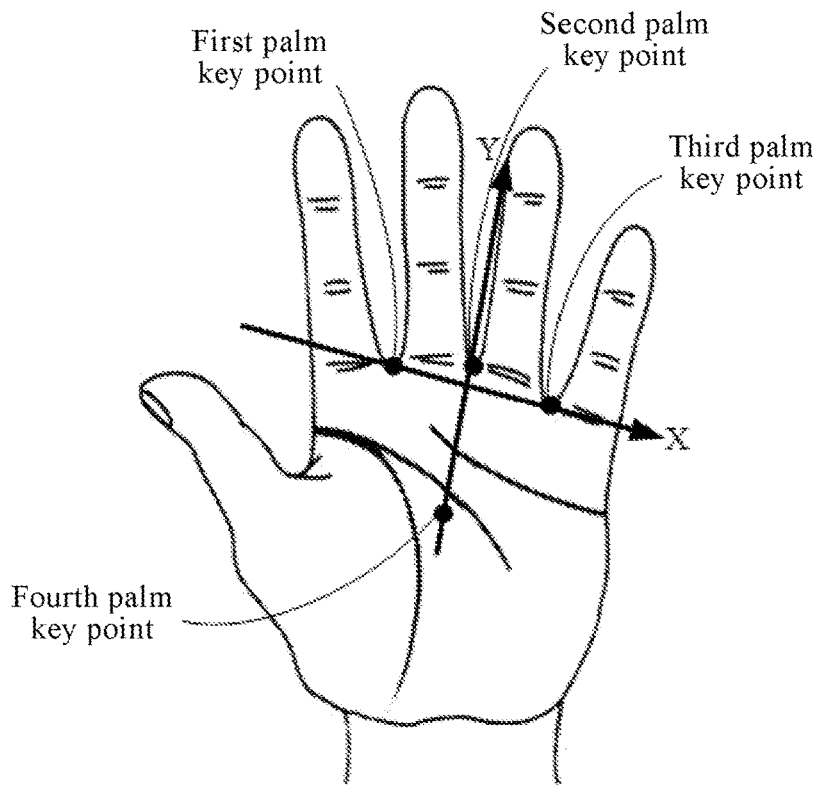
FIG. 5 is a schematic diagram of a position of a palm key point according to an embodiment of this disclosure.

For example, during determination of the fourth palm key point, the straight line formed by the first palm key point and the third palm key point is used as an X axis of a coordinate axis, and the straight line passing through the second palm key point and perpendicular to the X axis is used as a Y axis of the coordinate axis. A first direction from the first palm key point to the third palm key point is used as a positive direction of the X axis, and rotation is performed by 90 degrees counterclockwise in the first direction to obtain a second direction. The second direction is used as a positive direction of the Y axis. Along a negative direction of the Y axis, a palm key point separated from the second palm key point by the first distance is used as the fourth palm key point. The positional relationship between the first palm key point, the second palm key point, the third palm key point, the fourth palm key point, and the coordinate axis is shown in FIG. 5.

For example, the first palm key point is the gap key point between the index finger and the middle finger, the second palm key point is the gap key point between the middle finger and the ring finger, and the third palm key point is the gap key point between the ring finger and the little finger. The fourth palm key point determined through the first palm key point, the second palm key point, and the third palm key point is the center point of the palm.

3033: The computer device uses a product of the distance between the first palm key point and the third palm key point and a fourth preset value as a second distance, and then performs step 3034 or 3035.

In this embodiment of this disclosure, the fourth preset value is estimated by integrating a ratio of the distance between the first palm key point and the third palm key point to a size of the palm of the ordinary person. The size of the region where the palm is located may be determined through the distance between the first palm key point and the third palm key point and the fourth preset value subsequently.

The fourth preset value may be any value, such as 1.2 or 7/6. After determining the first palm key point and the third palm key point in the target hand image, the computer device may determine a distance between the first palm key point and the third palm key point, and use a product of the distance and the fourth preset value as a second distance. The target region may be determined through the second distance subsequently.

3034: The computer device determines a square target region with the fourth palm key point as a center of the target region and the second distance as a side length of the target region.

The fourth palm key point is used as the center and the second distance is used as the side length, so that the square target region in the target hand image can be obtained. To ensure the accuracy of the obtained target region, any side of the square target region is parallel to the straight line formed by the first palm key point and the third palm key point, thereby ensuring the integrity of the palm that the target region can cover, which improves the accuracy of a target palm print feature obtained subsequently.

3035: The computer device determines a circular target region with the fourth palm key point as the center of the target region and the second distance as a radius of the target region.

With the fourth palm key point as the center of the target region and the second distance as the radius of the target region, the circular region can be determined, and the circular region is used as the target region.

When the palm extraction model is called to obtain the target palm image, the target region is determined through the detected palm key points, which improves the accuracy of the determined target region and further improves the accuracy of the extracted target palm image.

304: The computer device performs palm extraction on the target region of the target hand image to obtain a target palm image.

Since the target region is the region where the palm is located, and the target region includes the palm prints of the palm, a palm image including the palm may be obtained by performing palm extraction on the target region. When palm extraction is performed on the target region, the target region of the target hand image may be cropped to obtain the target palm image.

This embodiment of this disclosure is described by determining the target region where the palm is located and obtaining the target palm image. In another embodiment, steps 302 to 304 are not required, and palm extraction may be directly performed on the target hand image to obtain the target palm image of the target hand image.

305: The computer device calls the feature extraction model to perform feature extraction on the target palm image, to obtain a target palm print feature.

Since the target palm image includes the palm prints of the palm, by calling the feature extraction model to perform feature extraction on the target palm image, a palm print feature of the palm in the target palm image can be obtained, that is, a palm print feature of the palm in the target hand image. The palm print feature may include a plurality of feature dimensions, for example, a 512-dimensional palm print feature.

306: According to similarities between the target palm print feature and each preset palm print feature, the computer device identifies a preset palm print feature with a largest similarity to the target palm print feature among the plurality of preset palm print features as a similar palm print feature.

A similarity between the target palm print feature and a preset palm print feature is used to indicate the similarity between the target palm print feature and the preset palm print feature. A higher similarity indicates a larger possibility that the target palm print feature and the preset palm print feature belong to the same user, and a lower similarity indicates a smaller probability that the target palm print feature and the preset palm print feature belong to the same user.

After the target palm print feature is obtained, similarities between the target palm print feature and each preset palm print feature are obtained, thereby obtaining a plurality of similarities. A largest similarity is selected from the determined plurality of similarities, and a preset palm print feature corresponding to the largest similarity is identified as a similar palm print feature. It may be considered that the similar palm print feature and the target palm print feature belong to the same user identifier. The similarity between the target palm print feature and the preset palm print feature may be determined using cosine similarity, Euclidean distance, or the like.

Since there are a plurality of preset palm print features stored in the computer device, and the plurality of preset palm print features may be palm print features registered by plurality of user identifiers, a similarity between a target palm print feature to be recognized and each preset palm print feature may be determined to determine a possibility that the plurality of preset palm print features stored in the computer device and the target palm print feature belong to the same user identifier, thereby obtaining a similar palm print feature most similar to the target user identifier.

The target palm print feature is compared with each preset palm print feature one by one, and the target user identifier is determined according to the similarities of the palm print features, which improves the accuracy of the determined target user identifier.

In addition, when the computer device is a terminal, the plurality of preset palm print features may be delivered to the terminal by the server, and the terminal stores the plurality of preset palm print features. When the computer device is a server, the plurality of preset palm print features may be obtained by the server performing palm print extraction on hand images sent by plurality of terminals, or may be obtained by receiving preset palm print features sent by plurality of terminals, and the server stores the plurality of preset palm print features.

For example, when the computer device is a terminal, and a plurality of users perform palm print registration, a user terminal sends hand images and corresponding user identifiers to the server, and the server performs palm extraction on the plurality of hand images to obtain palm print features of the plurality of users. The palm print features of the plurality of users and the corresponding user identifiers are delivered to the terminal, and the terminal stores the plurality of palm print features and the corresponding user identifiers correspondingly. Alternatively, when the computer device is a server, and a plurality of users perform palm print registration, a user terminal sends hand images and corresponding user identifiers to the server, and the server performs palm extraction on the plurality of hand images to obtain palm print features of the plurality of users. The server stores the plurality of palm print features and corresponding user identifiers correspondingly. Alternatively, when the computer device is a server, and a plurality of users perform palm print registration, palm print extraction is performed on obtained hand images through a user terminal to obtain corresponding palm print features. The corresponding palm print features are sent to the server through the user terminal, and the server stores the received palm print features and corresponding user identifiers correspondingly.

307: The computer device determines a user identifier corresponding to the similar palm print feature as a target user identifier of the target palm print feature.

Since the computer device stores a plurality of preset palm print features and a user identifier of each preset palm print feature, the computer device selects the similar palm print feature from the plurality of preset palm print features to obtain the user identifier of the similar palm print feature. In addition, when it is determined that the similar palm print feature and the target palm print feature belong to the same user identifier, the user identifier corresponding to the similar palm print feature is determined as the user identifier corresponding to the target palm print feature, that is, the target user identifier corresponding to the target hand image.

In this embodiment, the target user identifier is determined according to the similarity between the target palm print feature and each preset palm print feature. However, in another embodiment, steps 306 and 307 are not required, and recognition processing is performed on the target palm print feature according to a plurality of preset palm print features and user identifiers corresponding to the preset palm print features, to determine a target user identifier of the target hand image. The recognition processing manner may be other manners different from the foregoing steps 306 and 307, and this is not limited in this application.

This embodiment of this disclosure is described by determining the target region where the palm is located and obtaining the target palm image. In another embodiment, steps 302 to 304 are not required, and the palm extraction model may be called to perform palm extraction on the target hand image to obtain the target palm image of the target hand image. The palm extraction model is a model for extracting palm images of the user, which may be obtained through pre-training.

This embodiment is only described by determining the user identifier by using the obtained target hand image. In another embodiment, step 301 may include: acquiring a target hand image in response to a resource transfer request. The resource transfer request indicates that resource transfer needs to be performed, and the resource transfer request may carry a quantity of resources to be transferred, and may further carry an account to which the resources are to be transferred, and the like.

In a possible implementation, after determining the target user identifier of the target hand image, the method further includes: transferring resources of the target user identifier based on the resource transfer request.

For example, an account of the target user identifier (which is essentially the user identified by the target user identifier) is determined. The resource transfer request carries the quantity of resources to be transferred and the account to which the resources are to be transferred. From the account of the target user identifier, the resources of the quantity are transferred to the account to which the resources are to be transferred, to complete the transfer of the resources of the target user identifier.

As a type of biological feature, palm prints are as unique and distinguishable as biological features such as face, iris, and fingerprints. Compared with the human face that is currently widely used in identity verification, payment, access control, ride-hailing, and other fields, palm prints are not affected by makeup, masks, sunglasses, or the like, which can improve the accuracy of user identity verification. In some scenarios, such as epidemic prevention and control scenarios, it is necessary to wear a mask to cover the mouth and nose. In this case, using palm prints for identity verification can be a better choice.

Cross-device registration recognition is a capability that is very important to the user experience. For associated two types of devices, a user may register in one type of device, bind a user identifier of the user to a palm print feature of the user, and then perform identity verification on the other type of device. Since mobile phones and Internet of Things devices have large differences in image style and image quality, through cross-device registration and recognition, users may use an Internet of Things device directly after registering on a mobile phone, without the need for users to register on the two types of devices. For example, after a user registers through a mobile phone, the user may directly perform identity verification on a device of a store, without the need for the user to register on the device of the store, thereby avoiding leakage of information of the user.

In the method provided in this embodiment of this disclosure, the palm image is extracted from the obtained hand image, so that influencing factors on the palm print feature in the hand image are reduced, and the palm of the hand image is highlighted. In this way, the feature extraction model can accurately extract the palm print feature in the palm image, which improves the accuracy of the palm print feature. Therefore, the corresponding user identifier can be accurately determined according to the obtained palm print feature, and the accuracy of the obtained user identifier is improved. In addition, since the sample hand images used in training the feature extraction model are acquired by different types of devices, the feature extraction model can adapt to hand images acquired by various types of devices, and has a wide range of application. In addition, the trained feature extraction model can accurately perform feature extraction on hand images captured by various types of devices, which improves the robustness of the feature extraction model.

Figure 6:
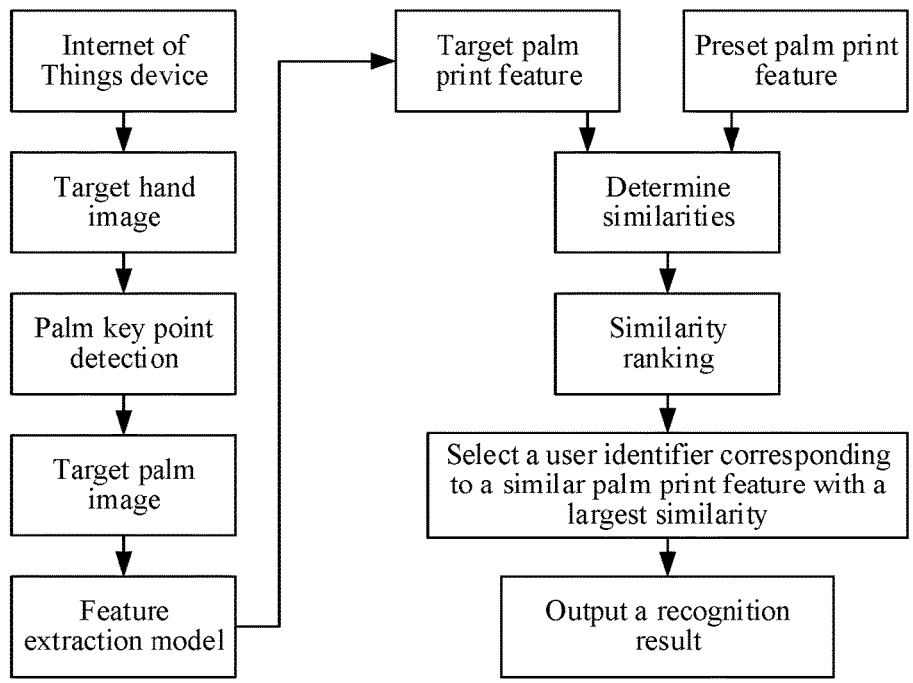
FIG. 6 is a flowchart of a palm print recognition method according to an embodiment of this disclosure.

FIG. 6 is a flowchart of a palm print recognition method according to this application. As shown in FIG. 6, the method includes:
1. When a user identifier is determined, a palm of a user is photographed through an device such as an Internet of Things device to obtain a target hand image.
2. Call a palm extraction model, and obtain a target palm image by performing palm extraction (for example, palm key point detection) on the target hand image.
3: Call a feature extraction model to perform feature extraction on the target palm image, to obtain a target palm print feature.
4. Arrange similarities between the target palm print feature and each preset palm print feature in descending order, determine a user identifier of a similar palm print feature corresponding to a largest similarity, identify the user identifier as a target user identifier, and output the recognition result.

Figure 7:
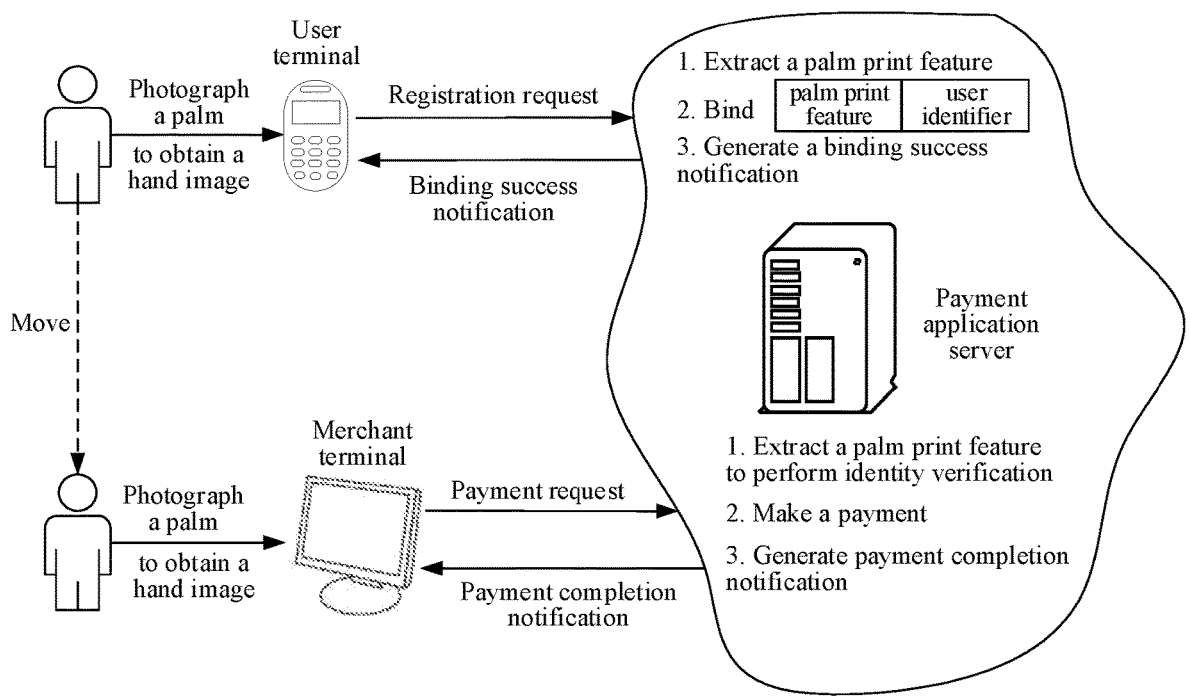
FIG. 7 is a flowchart of cross-device payment according to an embodiment of this disclosure.

Based on the foregoing embodiment, an embodiment of this disclosure further provides a cross-device payment scenario. FIG. 7 is a flowchart of cross-device payment. Referring to FIG. 7, a cross-device payment process involves a user terminal, a merchant terminal, and a payment application server.

A payment application is installed on the user terminal. The user terminal logs in to the payment application based on the user identifier, and establishes a communication connection with the payment application server. Through the communication connection, the user terminal and the server may interact with each other. A payment application is installed on the merchant terminal. The merchant terminal logs in to the payment application based on the user identifier, and establishes a communication connection with the server. Through the communication connection, the merchant terminal and the server may interact with each other.

The cross-device payment process includes:
1. A user holds a user terminal at home, and a palm of the user is photographed through the user terminal to obtain a hand image of the user. The payment application logged in based on the user identifier sends a palm print registration request to the payment application server. The palm print registration request carries the user identifier and the hand image.
2. The payment application server receives the palm print registration request sent by the user terminal, processes the hand image to obtain a palm print feature of the hand image, stores the palm print feature and the user identifier correspondingly, and sends a palm print binding success notification to the user terminal.

After the payment application server stores the palm print feature and the user identifier correspondingly, the palm print feature is used as a preset palm print feature. A corresponding user identifier may be determined through a stored preset palm print feature subsequently. The process of obtaining the palm print feature of the hand image by the payment application server is similar to the foregoing steps 302 to 305, and the details are not repeated herein.
3. The user terminal receives the palm print binding success notification, displays the palm print binding success notification, and prompts the user that the palm prints are bound with the user identifier.

The user completes the palm print registration through the interaction between the user terminal of the user and the payment application server, and can automatically pay through the palm prints subsequently.
4. When the user purchases a commodity in a store for a transaction, a merchant terminal captures the palm of the user to obtain a hand image. A payment application logged in based on a merchant identifier sends a payment request to the payment application server. The payment request carries the merchant identifier, a consumption amount, and the hand image.
5. After receiving the payment request, the payment application server processes the hand image, determines a user identifier of the hand image, determines an account of the user identifier in the payment application, completes the transfer through the account, and sends a payment completion notification to the merchant terminal to the merchant after the transfer is completed.

After using the user terminal to register the palm prints, the user can directly make payment through the palm prints at the merchant terminal, without the need for the user to register the palm prints on the merchant terminal, thereby implementing cross-device palm print recognition and improving the convenience. The process of obtaining the user identifier by the payment application server is similar to the foregoing steps 302 to 307.
6. The merchant terminal receives the payment completion notification, displays the payment completion notification, and prompts the user that the payment is completed, so that the user and the merchant complete the transaction of the item, and the user may take the item away.

In addition, in the process of implementing cross-device payment through the user terminal and the merchant terminal in the foregoing embodiment, the foregoing merchant terminal may be alternatively replaced by a payment device on a bus, to implement a cross-device bus payment solution according to the foregoing steps.

Figure 8:
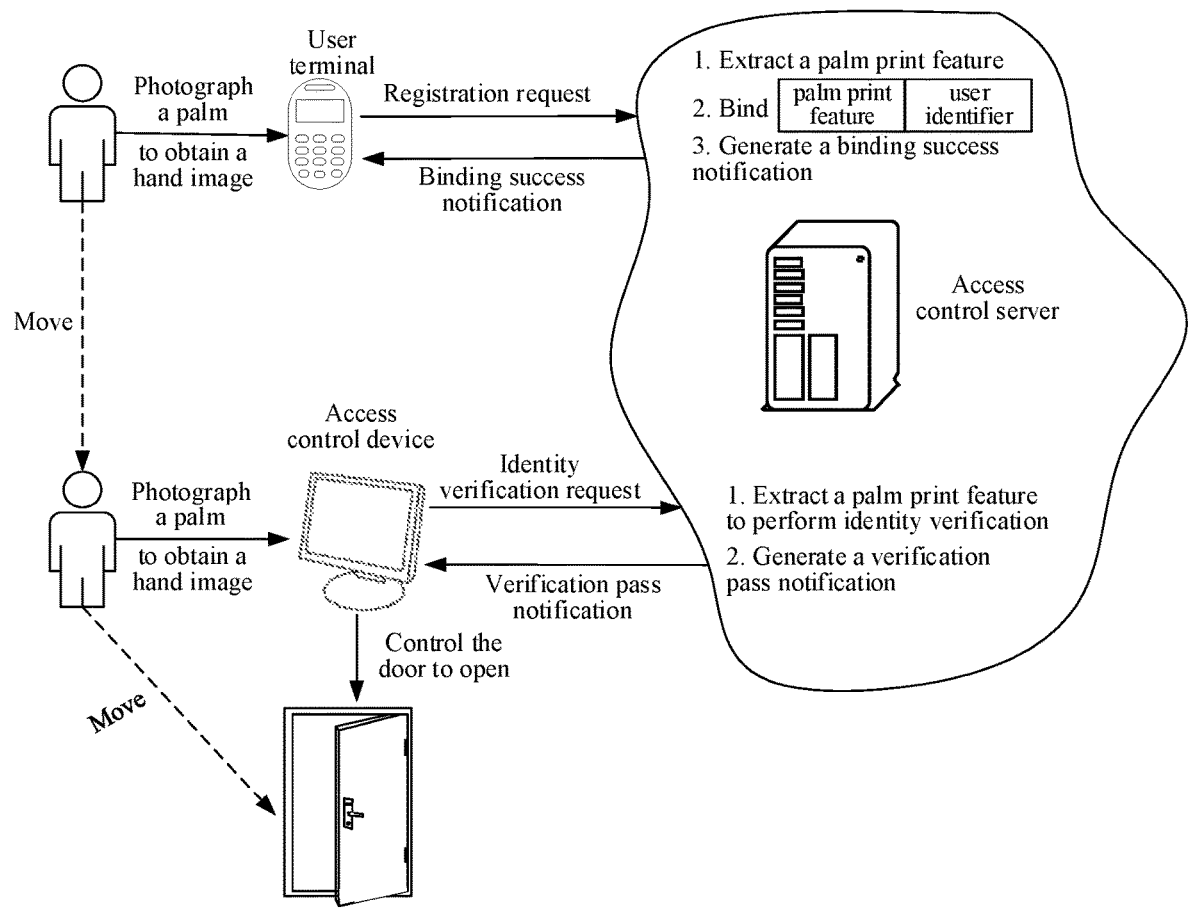
FIG. 8 is a flowchart of cross-device identity verification according to an embodiment of this disclosure.

An embodiment of this disclosure further provides a cross-device identity verification scenario, in which cross-device identity verification can be implemented. FIG. 8 is a flowchart of cross-device identity verification. Referring to FIG. 8, a cross-device identity verification process involves a user terminal, an access control device, and an access control server.

The user terminal establishes a communication connection with an access control server, and through the communication connection, the user terminal may interact with the access control server. The access control device establishes a communication connection with the access control server, and through the communication connection, the access control device may interact with the access control server.

The cross-device identity verification process includes:
1. A user holds a user terminal at home, and a palm of the user is photographed through the user terminal to obtain a hand image of the user. A palm print registration request is sent to the access control server. The palm print registration request carries the user identifier and the hand image.
2. The access control server receives the palm print registration request sent by the user terminal, processes the hand image to obtain a palm print feature of the hand image, stores the palm print feature and the user identifier correspondingly, and sends a palm print binding success notification to the user terminal.

After the access control server stores the palm print feature and the user identifier correspondingly, the palm print feature may be used as a preset palm print feature. A corresponding user identifier may be determined through a stored preset palm print feature subsequently. The process of obtaining the palm print feature of the hand image by the access control server is similar to the foregoing steps 302 to 305.

3. The user terminal receives the palm print binding success notification, displays the palm print binding success notification, and prompts the user that the palm prints are bound with the user identifier.

The user completes the palm print registration through the interaction between the user terminal of the user and the access control server, and the door can be opened automatically through the palm prints subsequently.

4. When the user goes home, the access control device captures the palm of the user, obtains a verified hand image of the user, and sends an identity verification request to the access control server, where the identity verification request carries the verified hand image.
5. The access control server receives the identity verification request sent by the access control device, performs recognition processing on the verified hand image, obtains a user identifier of the hand image, determines that the user is a registered user, and sends a verification pass notification to the access control device.

The process of obtaining the user identifier by the access control server is similar to the foregoing steps 302 to 307.

6. The access control device receives the verification pass notification sent by the access control server, and controls the door to open according to the verification pass notification so that the user can enter the room.

The foregoing embodiment is a process of implementing cross-device identity verification through the user terminal and the access control device, and may be further applied to a cross-device check-in scenario. A cross-device check-in process involves a user terminal, a check-in device, and a check-in server. The user terminal and the check-in device interact with the check-in server respectively to implement the solution of cross-device check-in.

Figure 9:
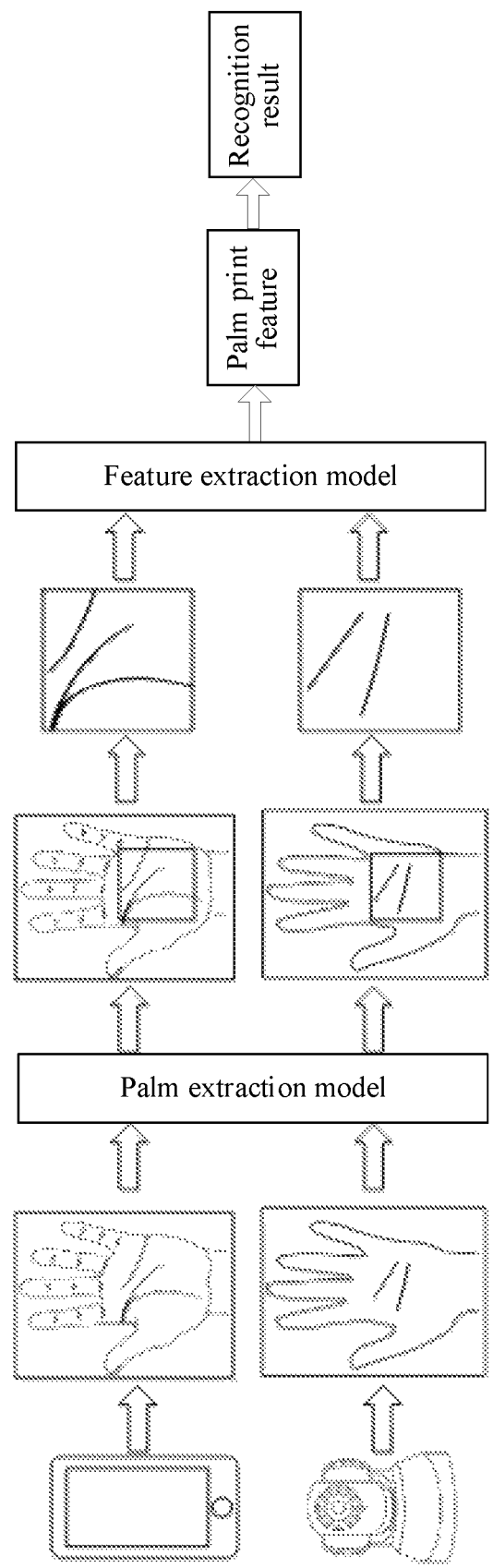
FIG. 9 is a flowchart of obtaining a recognition result according to an embodiment of this disclosure.

As can be learned from the foregoing cross-device payment scenarios and cross-device identity verification scenarios, as shown in FIG. 9, whether for the palm print registration stage of the interaction between the user terminal and the server, or the palm print recognition stage of the interaction with the server through other terminal devices, after the user terminal or other terminal devices obtains the hand image, the hand image is sent to the server. The server calls the palm extraction model to extract the palm image, and calls the feature extraction model to obtain the palm print feature. In addition, in the palm print recognition stage, the server obtains the recognition result of the current user by comparing the palm print feature with the preset palm print feature.

Based on the embodiment shown in FIG. 3, before the feature extraction model is called, the feature extraction model needs to be trained. For details of the training process, refer to the following embodiment.

Figure 10:
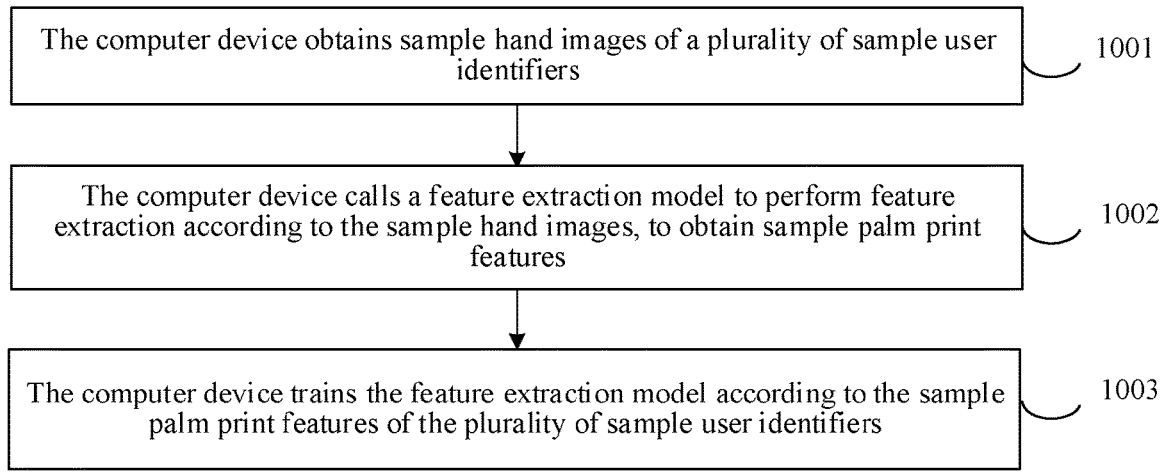
FIG. 10 is a flowchart of a model training method according to an embodiment of this disclosure.

FIG. 10 is a flowchart of a method for training a feature extraction model according to an embodiment of this disclosure. The method is applicable to a computer device. As shown in FIG. 10, the method includes:
1001: The computer device obtains sample hand images of a plurality of sample user identifiers.

The sample hand image includes a palm of a sample user identifier, and the palm may be a left palm of the sample user identifier (i.e., the user identified by the sample user identifier) or a right palm of the sample user identifier. The sample hand image may be obtained by photographing the palm of the sample user identifier by the computer device, or may be sent by other devices.

A plurality of sample hand images of a same sample user identifier are acquired by different types of devices featuring different image definition/resolution. Different types of devices may include mobile phones and Internet of Things devices. The Internet of Things devices may be palm print payment terminals, merchant payment terminals, and the like. Since the quality of sample hand images acquired by different types of devices for a palm of a same sample user identifier is different, there may be sample hand images with high definition, and sample hand images with low definition. Therefore, the feature extraction model is trained according to sample hand images acquired by different types of devices, so that the trained feature extraction model can perform feature extraction on the sample hand images acquired by different types of devices, thereby having a wide range of application, and improving the accuracy of the feature extraction model.

For example, eight sample hand images of any sample user identifier are obtained, where four sample hand images are obtained by photographing a palm of the sample user identifier with a mobile phone, and four sample hand images are obtained by photographing the palm of the sample user identifier through an Internet of Things device.

1002. The computer device calls a feature extraction model to perform feature extraction according to the sample hand images, to obtain sample palm print features.

The feature extraction model is an initialized feature extraction model, and is configured to perform feature extraction according to the sample hand images, to obtain sample palm print features.

In addition to the palm, the sample hand image obtained by the computer device may further include other information, such as a finger of the user and a shooting scene. Therefore, to avoid the impact of other information in the sample hand image, the palm in the sample hand image is highlighted, to improve the accuracy of the palm print feature obtained subsequently. In a possible implementation, the implementation of S1002 may be: performing palm extraction on each sample hand image to obtain a sample palm image of each sample hand image, and calling the feature extraction model to perform feature extraction on the sample palm image, to obtain a sample palm print feature. Therefore, sample palm images of the plurality of sample user identifiers can be obtained. Each sample user identifier includes a plurality of sample hand images, and a plurality of sample palm images of each sample user identifier is obtained.

Figure 11:
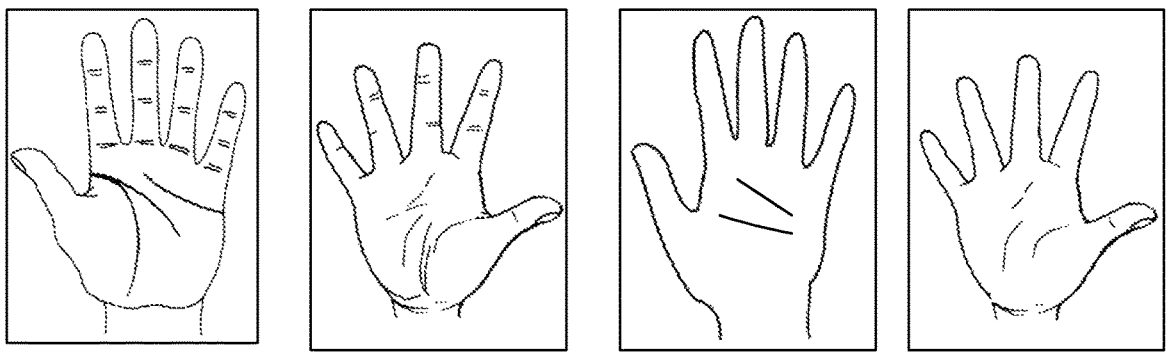
FIG. 11 is a schematic diagram of hand images and palm images according to an embodiment of this disclosure.
Figure 11:
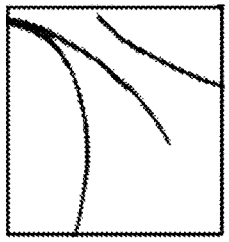
Figure 11:
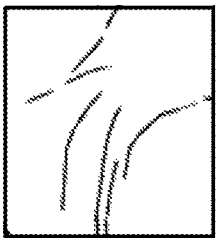
Figure 11:
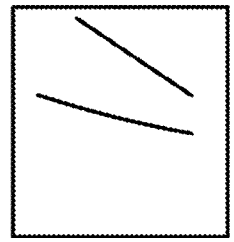
Figure 11:
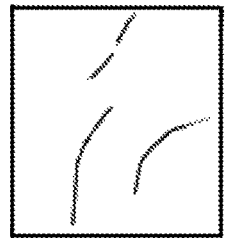
Figure 12:
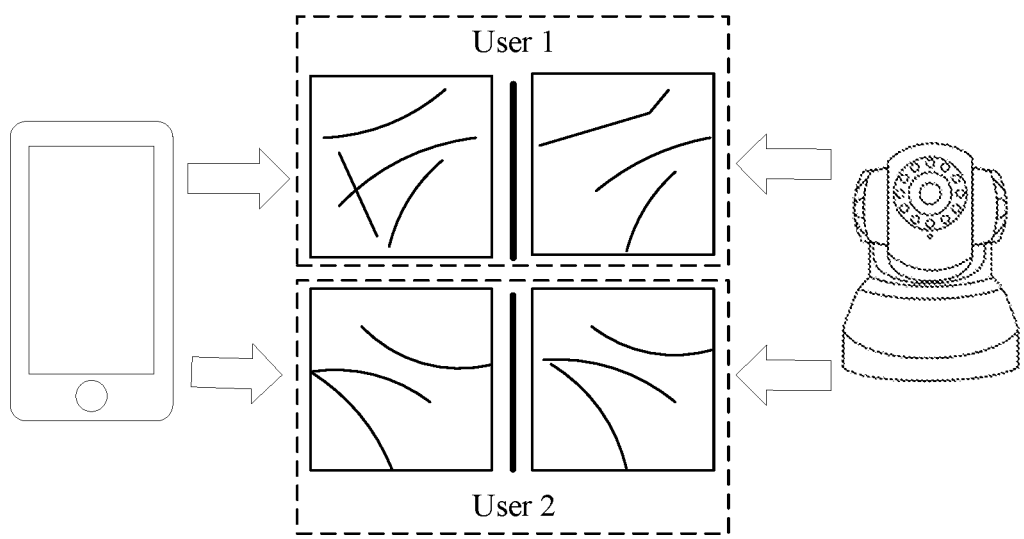
FIG. 12 is a schematic diagram of palm images of different types of devices according to an embodiment of this disclosure.

As shown in FIG. 11, figures (1) and (2) are hand images acquired by the mobile phone, figures (3) and (4) are hand images acquired by the Internet of Things device, figure (5), figure (6), figure (7), and figure (8) are palm images corresponding to figure (1), figure (2), figure (3) and figure (4) respectively. The hand images acquired by different devices have different definition, resulting in different quality of palm prints displayed in the obtained palm images. As shown in FIG. 12, a palm image in the upper left corner is obtained by photographing a palm of user 1 by a mobile phone, and a palm image in the upper right corner is obtained by photographing the palm of user 1 by another camera. As can be learned by comparing the two palm images, there are differences in the palm prints in the palm images acquired by different types of devices for the palm of the same user. A palm image in the lower left corner is obtained by photographing a palm of user 2 by a mobile phone, and a palm image in the lower right corner is obtained by photographing the palm of user 2 by another camera. As can be learned by comparing the two palm images, there are differences in the palm prints in the palm images acquired by different types of devices for the palm of the same user.

In a possible implementation, the computer device may call a palm extraction model to perform palm extraction on each sample hand image to obtain the sample palm images of the plurality of sample user identifiers. The palm extraction model is a pre-trained model configured to obtain palm images.

The feature extraction model is called to perform feature extraction on each sample palm image, to obtain a sample palm print feature of each sample palm image, so that the feature extraction model can be trained through a plurality of obtained sample palm print features subsequently.

1003: The computer device trains the feature extraction model according to the sample palm print features of the plurality of sample user identifiers.

When S1003 is performed, a loss value of the feature extraction model may be determined first according to the sample palm print features of the plurality of sample user identifiers; and the feature extraction model may be trained according to the obtained loss value.

In the case of performing palm extraction on each sample hand image to obtain a sample palm image of each sample hand image, and calling the feature extraction model to perform feature extraction on the sample palm image, to obtain a sample palm print feature, the implementation of S1003 may include the following steps:

1031: The computer device generates a plurality of positive sample image combinations and a plurality of negative sample image combinations according to the sample palm images of the plurality of sample user identifiers.

The positive sample image combination includes two sample palm images belonging to a same sample user identifier, and the negative sample image combination includes two sample palm images respectively belonging to different sample user identifiers.

For a plurality of sample palm images of any sample user identifier, the plurality of sample palm images are combined in pairs to obtain a plurality of positive sample image combinations of the sample user identifier. The sample palm images of each sample user identifier are respectively combined to obtain positive sample image combinations of each sample user identifier.

For example, if any sample user identifier corresponds to sample palm image 1, sample palm image 2, and sample palm image 3, an obtained positive sample image combination A includes sample palm image 1 and sample palm image 2, a positive sample image combination B includes sample palm image 1 and sample palm image 3, and a positive sample image combination C includes sample palm image 2 and sample palm image 3.

For sample palm images of any two sample user identifiers in the plurality of sample user identifiers, one sample palm image of one sample user identifier is combined with another sample palm image of the other sample user identifier, to obtain a plurality of negative sample image combinations corresponding to the two sample user identifiers. Sample palm images of each two sample user identifiers are combined in pairs, thereby obtaining a plurality of negative sample image combinations.

For example, if a first sample user identifier corresponds to sample palm image 1 and sample palm image 2, and the second sample user identifier corresponds to sample palm image 3 and sample palm image 4, an obtained negative sample image combination A may include sample palm image 1 and sample palm image 3, a negative sample image combination B may include sample palm image 1 and sample palm image 4, a negative sample image combination C includes sample palm image 2 and sample palm image 3, and a negative sample image combination D includes sample palm image 2 and sample palm image 4.

This embodiment of this disclosure is described by obtaining the sample palm print features of the sample palm images first, and then generating the positive sample image combinations and the negative sample image combinations. In another embodiment, the step of generating a plurality of positive sample image combinations and a plurality of negative sample image combinations may be performed before the step of performing feature extraction on each sample palm image to obtain a sample palm print feature.

1032: The computer device obtains a similarity of each positive sample image combination and a similarity of each negative sample image combination according to the obtained sample palm print features of the plurality of sample palm images.

The similarity of the positive sample image combination represents a similarity between sample palm print features of two sample palm images in the positive sample image combination, and the similarity of the negative sample image combination represents a similarity between sample palm print features of two sample palm images in the negative sample image combination.

Since both the positive sample image combination and the negative sample image combination include two sample palm images, sample palm print features of two sample palm images in each sample image combination are compared to determine a similarity of each sample image combination. The similarity of the sample image combination may be obtained by using methods such as Euclidean distance and cosine similarity.

In a possible implementation, this step may include: for any positive sample image combination $p(i,j)$, obtaining a similarity $sim(p(i,j))$ of the positive sample image combination $p(i,j)$ according to sample palm features of two sample palm images included in the positive sample image combination, and the following relationship is met:

$$sim(p(i,j)) = \cos_{sim}[F(x_{p(i)}), F(x_{p(j)})]$$

$$p \in 1, \ldots, m, i, j \in 1, \ldots, N, i \neq j,$$

where p represents a $p^{th}$ sample user identifier among a plurality of sample user identifiers; m represents a total quantity of the plurality of sample user identifiers; i represents an $i^{th}$ sample palm image in the N sample palm images corresponding to the sample user identifier p, j represents a $j^{th}$ sample palm image in the N sample palm images corresponding to the sample user identifier p, i is not equal to j, and N represents a total quantity of sample palm images corresponding to the sample user identifier p; $x_{p(i)}$ represents an $i^{th}$ sample palm image of the sample user identifier p; $x_{p(j)}$ represents a $j^{th}$ sample palm image of the sample user identifier p; $F(x_{p(i)})$ represents a sample palm feature of an $i^{th}$ sample palm image of the sample user identifier p; $F(x_{p(j)})$ represents a sample palm feature of a $j^{th}$ sample palm image of the sample user identifier p; and $\cos_{sim}[\ ]$ is a cosine similarity function used to obtain a similarity between two sample palm features.

In a possible implementation, this step may include: for any negative sample image combination p,q(i,j), obtaining a similarity sim(p,q(i,j)) of the negative sample image combination p,q(i,j) according to sample palm features of two sample palm images included in the negative sample image combination, and the following relationship is met:

$$sim(p,q(i,j)) = \cos_{sim}[F(x_{p(i)}), F(x_{q(j)})]$$

$$p \in 1, \ldots, m, q \in 1, \ldots, m,$$

where p represents a $p^{th}$ sample user identifier among m sample user identifiers; q represents a $q^{th}$ sample user identifier among m sample user identifiers, the $q^{th}$ sample user identifier being different from the $p^{th}$ sample user identifier; m represents a total quantity of the plurality of sample user identifiers; i represents an $i^{th}$ sample palm image in the plurality of sample palm images corresponding to the sample user identifier p, and j represents a $j^{th}$ sample palm image in the plurality of sample palm images corresponding to the sample user identifier q; $x_{p(i)}$ represents an $i^{th}$ sample palm image of the sample user identifier p; $x_{q(j)}$ represents a $j^{th}$ sample palm image of the sample user identifier q; $F(x_{p(i)})$ represents a sample palm feature of an $i^{th}$ sample palm image of the sample user identifier p; and $F(x_{q(j)})$ represents a sample palm feature of a $j^{th}$ sample palm image of the sample user identifier p; and $\cos_{sim}[\ ]$ is a cosine similarity function used to obtain a similarity between two sample palm features.

1033: The computer device determines the loss value of the feature extraction model according to the similarities of the plurality of positive sample image combinations and the similarities of the plurality of negative sample image combinations.

This loss value is used to represent an error of the feature extraction model. In this embodiment of this disclosure, the loss value of the feature extraction model is determined, so that the loss value may be used to train the feature extraction model to reduce the loss value subsequently.

Since sample palm images in a positive sample image combination belong to a same sample user identifier, a theoretical similarity of the positive sample image combination is to be large enough; and since sample palm images in a negative sample image combination do not belong to a same sample user identifier, a theoretical similarity of the negative sample image combination is to be small enough. For example, if a value range of the similarity is [0, 1], the theoretical similarity of the positive sample image combination is 1, and the theoretical similarity of the negative sample image combination is 0. However, since sample palm images are obtained by different types of devices, for a same user identifier, the sample hand images of different quality result in different quality of obtained sample palm images, that is, obtained palm print features may be different. Therefore, there is an error between the obtained similarity of the positive sample image combination and the corresponding theoretical similarity, and there is also an error between the obtained similarity of the negative sample image combination and the corresponding theoretical similarity. Through similarities of a plurality of positive sample image combinations and similarities of a plurality of negative sample image combinations, the loss value of the feature extraction model is determined, so that the feature extraction model is subsequently trained to reduce the loss value, thereby improving the accuracy of the feature extraction model.

In a possible implementation, this step may include the following four manners:

A first manner includes the following steps 1061 to 1063:

1061: Perform statistics on the similarities of the plurality of positive sample image combinations to obtain a first statistical value corresponding to the plurality of positive sample image combinations.

Since two sample palm images in a positive sample image combination belong to a same sample user identifier, and two sample palm images in a negative sample image combination do not belong to a same sample user identifier, a real similarity of the positive sample image combination is to be larger than a real similarity of the negative sample image combination. Therefore, the similarities of the plurality of positive sample image combinations and the similarities of the plurality of negative sample image combinations are processed, to determine the loss value of the feature extraction model.

The first statistical value is a comprehensive representation of the similarities of the plurality of positive sample image combinations, which may be a mean value, a sum value, a weighted average value, a weighted sum value, etc. of the similarities of the plurality of positive sample image combinations. Statistics is performed on the similarities of the plurality of positive sample image combinations, so that the loss value of the feature extraction model can be determined according to the first statistical value, and the similarities of the plurality of positive sample image combinations are comprehensively considered in the loss value, thereby improving the accuracy of the feature extraction model.

In a possible implementation, step 1061 may include: determining a ratio of a sum of the similarities of the plurality of positive sample image combinations to a quantity of the plurality of positive sample image combinations as the first statistical value corresponding to the plurality of positive sample image combinations. The first statistical value is then a mean value of the similarities of the plurality of positive sample image combinations.

In another possible implementation, step 1061 may include: determining a sum of the similarities of the plurality of positive sample image combinations as the first statistical value corresponding to the plurality of positive sample image combinations. The first statistical value is then a sum value of the similarities of the plurality of positive sample image combinations.

1062: Perform statistics on the similarities of the plurality of negative sample image combinations to obtain a second statistical value corresponding to the plurality of negative sample image combinations.

The second statistical value is a comprehensive representation of the similarities of the plurality of negative sample image combinations, which may be a mean value, a sum value, a weighted average value, a weighted sum value, etc. of the similarities of the plurality of negative sample image combinations. Statistics is performed on the similarities of the plurality of negative sample image combinations, so that the loss value of the feature extraction model can be determined according to the first statistical value, and the similarities of the plurality of negative sample image combinations are comprehensively considered in the loss value, thereby improving the accuracy of the feature extraction model.

In a possible implementation, step 1062 may include: determining a ratio of a sum of the similarities of the plurality of negative sample image combinations to a quantity of the plurality of negative sample image combinations as the second statistical value corresponding to the plurality of negative sample image combinations. The second statistical value is then a mean value of the similarities of the plurality of negative sample image combinations.

In another possible implementation, step 1062 may include: determining a sum of the similarities of the plurality of negative sample image combinations as the second statistical value corresponding to the plurality of negative sample image combinations. The second statistical value is then a sum value of the similarities of the plurality of negative sample image combinations.

1063: Determine a difference between the second statistical value and the first statistical value as the loss value of the feature extraction model.

Figure 13:
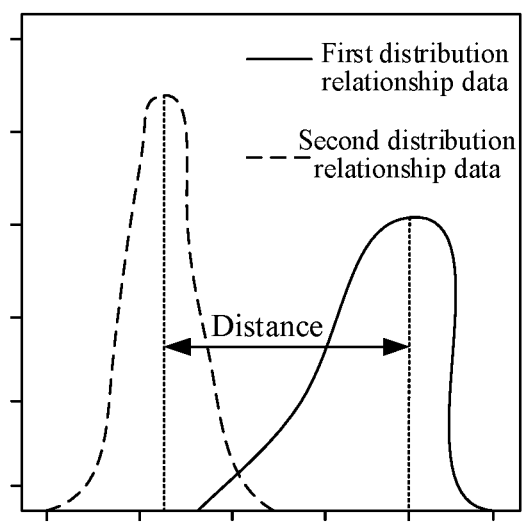
FIG. 13 is a schematic diagram of a distance between mean values of similarities of a positive sample image combination and a negative sample image combination according to an embodiment of this disclosure.

The difference represents the difference between the similarities of the negative sample image combinations and the similarities of the positive sample image combinations. As shown in FIG. 13, a negative value of a distance between a mean value of first distribution relationship data and a mean value of second distribution relationship data is the loss value of the feature extraction model. In this case, the loss value of the feature extraction model may be referred to as a first loss value.

The second statistical value is obtained by performing statistics on the similarities of the plurality of negative sample image combinations, and the first statistical value is obtained by performing statistics on the similarities of the plurality of positive sample image combinations, and real similarities of the positive sample image combinations are larger than real similarities of the negative sample image combinations. Therefore, the difference is used as the loss value of the feature extraction model, so that the feature extraction model is trained through the loss value subsequently, to reduce the loss value. The difference between the similarities of the positive sample image combinations and the similarities of the negative sample image combinations is increased, so that the similarities of the positive sample image combinations and the similarities of the negative sample image combinations can be distinguished, that is, the capability of the feature extraction model for distinguishing extracted palm print features is improved. Different palm print features can be extracted for different palm images through the feature extraction model subsequently, and differences between different palm print features are large, so that different palm print features can be distinguished subsequently.

In a possible implementation, the first statistical value E ($C_{sim}^1$), the second statistical value E($C_{sim}^2$), and the first loss value Loss$_{mean}$ meet the following relationship:

$$Loss_{mean} = -\alpha_3[E(C_{sim}^1) - E(C_{sim}^2)]$$

where $\alpha_3$ represents a weight parameter, and $\alpha_3$ is a constant, such as 0.1 or 0.2; $C_{sim}^1$ represents a distribution of the similarities of the plurality of positive sample image combinations; and $C_{sim}^2$ represents a distribution of the similarities of the plurality of negative sample image combinations.

According to the generated plurality of positive sample image combinations and plurality of negative sample image combinations, the feature extraction model is trained, so that a distinguishing degree between different palm print features extracted by the obtained feature extraction model is increased, thereby improving the distinguishing degree of the palm print features extracted by the feature extraction model, and further improving the accuracy of the feature extraction model.

A second manner includes the following steps 1064 to 1067:

1064: Determine first distribution relationship data according to the similarities of the plurality of positive sample image combinations.

The first distribution relationship data represents a distribution of the similarities of the plurality of positive sample image combinations, and the first distribution relationship data may be Gaussian distribution relationship data or histogram distribution relationship data. Statistical analysis is performed on the similarities of the plurality of positive sample image combinations, so that the distribution of the similarities of the plurality of positive sample image combinations can be obtained, thereby obtaining the first distribution relationship data.

In a possible implementation, the first distribution relationship data meets the following relationship:

$$h(t) = \sum_{(i,j):m_{ij}=1} \frac{1}{|sim|} \delta_{i,j,t}$$

$$\delta_{i,j,t} = e^{-\zeta[sim(i,j)-hn_t]}$$

where m represents a total quantity of the plurality of sample user identifiers, and $m_{ij}=1$ represents the positive sample image combinations; (i,j):$m_{ij}=1$ represents all positive sample image combinations formed by sample hand images of a plurality of sample user identifiers; for any sample user identifier, (i,j) represents a plurality of positive sample image combinations formed by different sample palm images of the sample user identifier; |sim| represents an absolute value of a similarity of any positive sample image combination; $\delta_{i,j,t}$ represents a variable in the first distribution relationship data; e represents a natural constant; $\zeta$ represents an extended parameter of the Gaussian kernel function, $\zeta$ being a constant; sim(i,j) represents a similarity of any positive sample image combination; and $hn_t$ is a variable in the first distribution relationship data, which represents a $t^{th}$ node in the first distribution relationship data.

1065: Obtain a mean value of the similarities of the plurality of positive sample image combinations to obtain an original statistical value corresponding to the plurality of positive sample image combinations, and add a first preset value to the original statistical value to obtain a target statistical value corresponding to the plurality of positive sample image combinations.

The original statistical value is the mean value of the similarities of the plurality of positive sample image combinations, and the first preset value may be any value, such as 0.05 or 0.1. The target statistical value is an expected value of the mean value of the similarities of the plurality of positive sample image combinations, that is, the expected statistical value that the original statistical value can reach. The first preset value is added to the original statistical value to obtain the target statistical value corresponding to the plurality of positive sample image combinations, so that the feature extraction model can be adjusted according to the target statistical value subsequently.

In a possible implementation, the original statistical value $\mu_{C1}$ corresponding to the plurality of positive sample image combinations, the first preset value r, and the target statistical value $\mu_{T1}$ corresponding to the plurality of positive sample image combinations meet the following relationship:

$$\mu_{T1}=\mu_{C1}+r$$

1066: Determine first target distribution relationship data by using the target statistical value as a mean value and a second preset value as a standard deviation.

The second preset value may be any value, such as 0.01 or 0.05. The first target distribution relationship data is used to represent an expected distribution of the similarities of the plurality of positive sample image combinations. The first target distribution relationship data may be Gaussian distribution relationship data, or other distribution relationship data. After the mean value and the standard deviation are determined, an expected distribution that the similarities of the plurality of positive sample image combinations can achieve may be determined, that is, the first target distribution relationship data.

1067: Determine the loss value of the feature extraction model according to a difference between the first distribution relationship data and the first target distribution relationship data.

The first distribution relationship data represents the current distribution of the similarities of the plurality of positive sample image combinations, and the first target distribution relationship data represents the expected distribution of the similarities of the plurality of positive sample image combinations. The difference between the first distribution relationship data and the first target distribution relationship data, that is, the difference between the distribution of the similarities of the plurality of positive sample image combinations and the expected distribution, is determined, and the difference is determined as the loss value of the feature extraction model, so that the model can be adjusted subsequently the loss value of the feature extraction model can be reduced, and the difference between the first distribution relationship data and the first target distribution relationship data is reduced. In this way, the distribution of the similarities of the plurality of positive sample image combinations meets the expected distribution, thereby improving the accuracy of the feature extraction model. In this case, the loss value of the feature extraction model may be referred to as a second loss value.

In a possible implementation, the first distribution relationship data $C_{sim}^1$, the first target distribution relationship data $T_{sim}^1$, and the second loss value $D_{KL}(T_{sim}^1\|C_{sim}^1)$ meet the following relationship:

$$D_{KL}(T_{sim}^1\|C_{sim}^1) = \sum_s T_{sim}^1(s) \log \frac{T_{sim}^1(s)}{C_{sim}^1(s)}$$

s represents a serial number of the positive sample image combinations, $C_{sim}^1(s)$ represents a similarity of an $s^{th}$ positive sample image combination, and $T_{sim}^1(s)$ represents a target similarity corresponding to the $s^{th}$ positive sample image combination in the first target distribution relationship data $T_{sim}^1$.

A third manner includes the following steps 1068 to 1072:

1068: Determine first distribution relationship data according to similarities of a plurality of positive sample image combinations in a first training round.

In this embodiment of this disclosure, the feature extraction model is trained through a plurality of training rounds, sample hand images used in each training round are different, and a currently ongoing training round may be denoted as a first training round. Sample hand images used in different training rounds may be completely different or partially different. For example, sample hand image 1, sample hand image 2, and sample hand image 3 of sample user identifier A are used in the first training round, and sample hand image 3, sample hand image 4, and sample hand image 5 of sample user identifier A are used in a second training round; or sample hand image 1, sample hand image 2, and sample hand image 3 of sample user identifier A are used in the first training round, and sample hand image 1, sample hand image 2, and sample hand image 4 of sample user identifier A are used in a second training round.

In addition, since different positive sample image combinations may include the same sample hand images, the positive sample image combinations used in the plurality of training rounds of the feature extraction model are different, that is, the positive sample image combinations used in different training rounds may be completely different or partially different. For example, in the first training round, positive sample image combination A includes sample hand image 1 and sample hand image 2, and positive sample image combination B includes sample hand image 3 and sample hand image 4; and in the second training round, positive sample image combination C includes sample hand image 1 and sample hand image 3, and positive sample image combination D includes sample hand image 3 and sample hand image 2.

For any training round, a loss value of the feature extraction model is determined by using positive sample image combinations corresponding to used sample hand images, so that the feature extraction model can be trained through the loss value subsequently.

The first distribution relationship data represents the distribution of the similarities of the plurality of positive sample image combinations.

1069: Obtain a mean value of the similarities of the plurality of positive sample image combinations in the first training round to obtain an original statistical value corresponding to the plurality of positive sample image combinations.

In this embodiment of this disclosure, in each training round, the feature extraction model needs to be called to perform feature extraction on the sample hand images used in the first training round, to obtain the similarities of the plurality of positive sample image combinations in the first training round. The subsequent process of obtaining the original statistical value of the first training round through the similarities of the plurality of positive sample image combinations in the first training round is similar to the foregoing step 1065, and the details are not repeated herein.

1070: Add a first preset value to a target statistical value corresponding to a plurality of positive sample image combinations in a second training round, to obtain a target statistical value corresponding to the plurality of positive sample image combinations in the first training round.

The second training round is a previous training round of the first training round, and the first preset value may be any value, such as 0.05 or 0.1. The target statistical value is an expected value of the original statistical value of the first training round, that is, an expected value that the mean value of the similarities of the plurality of positive sample image combinations can reach after the feature extraction model is trained in the first training round.

In this embodiment of this disclosure, the training process of the feature extraction model is divided into a plurality of training rounds, and target statistical values are respectively set for each training round, so that the feature extraction model can be trained step by step subsequently, and thus the accuracy of the feature extraction model can be gradually improved, thereby ensuring the stability of training the feature extraction model and improving the accuracy of the obtained feature extraction model.

This embodiment of this disclosure is described by determining the target statistical value in the case that the first training round is not the first round of the training. When the first training round is the first round of the training among the plurality of training rounds, the first preset value is added to the original statistical value of the first training round as the target statistical value of the first training round, that is, the foregoing step 1065 is used, to obtain the target statistical value of the first training round.

1071: Determine first target distribution relationship data by using the target statistical value corresponding to the plurality of positive sample image combinations in the first training round as a mean value and a second preset value as a standard deviation.

This step is similar to step 1066, and details are not described herein.

1072: Determine the loss value of the feature extraction model according to a difference between the first distribution relationship data and the first target distribution relationship data.

This step is similar to step 1067, and details are not described herein.

A fourth manner includes the following steps 1073 to 1076:

1073: Determine second distribution relationship data according to the similarities of the plurality of negative sample image combinations.

The second distribution relationship data represents a distribution of the similarities of the plurality of negative sample image combinations, and the second distribution relationship data may be Gaussian distribution relationship data or histogram distribution relationship data. Statistical analysis is performed on the similarities of the plurality of negative sample image combinations, so that the distribution of the similarities of the plurality of negative sample image combinations can be obtained, thereby obtaining the second distribution relationship data.

In a possible implementation, the second distribution relationship data meets the following relationship:

$$h(t) = \sum_{(i,j):m_{ij}=-1} \frac{1}{|sim|} \delta_{i,j,t}$$

$$\delta_{i,j,t} = e^{-\zeta[sim(i,j)-hn_t]}$$

where m represents a total quantity of the plurality of sample user identifiers, and $m_{ij}=-1$ represents the negative sample image combinations; $(i,j):m_{ij}=-1$ represents all negative sample image combinations formed by sample hand images of a plurality of sample user identifiers; for any two sample user identifiers, (i,j) represents a plurality of negative sample image combinations formed by sample palm images of the two sample user identifier; |sim| represents an absolute value of a similarity of any negative sample image combination; $\delta_{i,j,t}$ represents a variable in the second distribution relationship data; e represents a natural constant; $\zeta$ represents an extended parameter of the Gaussian kernel function, $\zeta$ being a constant; sim(i,j) represents a similarity of any negative sample image combination; and $hn_t$ is a variable in the second distribution relationship data, which represents a $t^{th}$ node in the second distribution relationship data.

1074: Obtain a mean value of the similarities of the plurality of negative sample image combinations to obtain an original statistical value corresponding to the plurality of negative sample image combinations, and subtract a first preset value from the original statistical value to obtain a target statistical value corresponding to the plurality of negative sample image combinations.

The original statistical value is the mean value of the similarities of the plurality of negative sample image combinations, and the first preset value may be any value, such as 0.05 or 0.1. The target statistical value is an expected value of the mean value of the similarities of the plurality of negative sample image combinations, that is, the expected statistical value that the original statistical value can reach. The first preset value is added to the original statistical value to obtain the target statistical value corresponding to the plurality of negative sample image combinations, so that the feature extraction model can be adjusted according to the target statistical value subsequently.

In a possible implementation, the original statistical value $\mu_{C2}$ corresponding to the plurality of negative sample image combinations, the first preset value r, and the target statistical value $\mu_{T2}$ corresponding to the plurality of negative sample image combinations meet the following relationship:

$$\mu_{T2}=\mu_{C2}-r$$

1075: Determine second target distribution relationship data by using the target statistical value as a mean value and a second preset value as a standard deviation.

The second target distribution relationship data may be Gaussian distribution relationship data, or other distribution relationship data. After the mean value and the standard deviation are determined, an expected distribution that the similarities of the plurality of negative sample image combinations can achieve may be determined, that is, the second target distribution relationship data.

1076: Determine the loss value of the feature extraction model according to a difference between the second distribution relationship data and the second target distribution relationship data.

The second distribution relationship data represents the distribution of the similarities of the plurality of negative sample image combinations, and the second target distribution relationship data represents the expected distribution of the similarities of the plurality of negative sample image combinations. The difference between the second distribution relationship data and the second target distribution relationship data, that is, the difference between the distribution of the similarities of the plurality of negative sample image combinations and the expected distribution, is determined, and the difference is determined as the loss value of the feature extraction model, so that the model can be adjusted subsequently the loss value of the feature extraction model can be reduced, and the difference between the second distribution relationship data and the second target distribution relationship data is reduced. In this way, the distribution of the similarities of the plurality of negative sample image combinations meets the expected distribution, thereby improving the accuracy of the feature extraction model. In this case, the loss value of the feature extraction model may be referred to as a third loss value.

In a possible implementation, the first distribution relationship data $C_{sim}^2$, the first target distribution relationship data $T_{sim}^2$, and the third loss value $D_{KL}(T_{sim}^2 \| C_{sim}^2)$ meet the following relationship:

$$D_{KL}(T_{sim}^2 \| C_{sim}^2) = \sum_s T_{sim}^2(s) \log \frac{T_{sim}^2(s)}{C_{sim}^2(s)}$$

s represents a serial number of the positive sample image combinations, $C_{sim}^2(s)$ represents a similarity of an $s^{th}$ negative sample image combination, and $T_{sim}^2(s)$ represents a target similarity corresponding to the $s^{th}$ negative sample image combination in the second target distribution relationship data $T_{sim}^1$.

A fifth manner includes the following steps 1077 to 1081:

1077: Determine second distribution relationship data according to similarities of a plurality of negative sample image combinations in a first training round.

The second distribution relationship data represents a distribution of the similarities of the plurality of negative sample image combinations, and sample hand images used in a plurality of training rounds of the feature extraction model are different.

This step is similar to step 1068, and details are not described herein.

1078: Obtain a mean value of the similarities of the plurality of negative sample image combinations in the first training round to obtain an original statistical value corresponding to the plurality of negative sample image combinations.

This step is similar to step 1069, and details are not described herein.

In this embodiment of this disclosure, in each training round, the feature extraction model needs to be called to perform feature extraction on the sample hand images used in the first training round, to obtain the similarities of the plurality of negative sample image combinations in the first training round. The subsequent process of obtaining the original statistical value of the first training round through the similarities of the plurality of negative sample image combinations in the first training round is similar to the foregoing step 1074, and the details are not repeated herein.

1079: Subtract a first preset value from a target statistical value corresponding to a plurality of negative sample image combinations in a second training round, to obtain a target statistical value corresponding to the plurality of negative sample image combinations in the first training round.

This step is similar to step 1070, and details are not described herein.

This embodiment of this disclosure is described by determining the target statistical value in the case that the first training round is not the first round of the training. When the first training round is the first round of the training among the plurality of training rounds, the first preset value is subtracted from the original statistical value of the first training round as the target statistical value of the first training round, that is, the foregoing step 1074 is used, to obtain the target statistical value of the first training round.

1080: Determine second target distribution relationship data by using the target statistical value corresponding to the plurality of negative sample image combinations in the first training round as a mean value and a second preset value as a standard deviation.

This step is similar to step 1071, and details are not described herein.

1081: Determine the loss value of the feature extraction model according to a difference between the second distribution relationship data and the second target distribution relationship data.

This step is similar to step 1072, and details are not described herein.

In this embodiment of this disclosure, the foregoing five manners are respectively described, and in another embodiment, the foregoing five manners may be combined, for example, the first manner, the third manner, and the fifth manner are combined; or the first manner, the second manner, and the fourth manner are combined; or the third manner and the fifth manner are combined; or the second manner and the fourth manner are combined.

1034: The computer device trains the feature extraction model according to the loss value.

The computer device trains the feature extraction model according to the obtained loss value, to reduce the loss value, thereby improving the accuracy of the feature extraction model.

During determining of the loss value of the feature extraction model, one or more of the five manners in the foregoing embodiment may be used. When one manner is used, the loss value may be determined according to the corresponding manner in the foregoing embodiment; and when a plurality of manners are used, statistics is performed on loss values obtained in the plurality of manners, to obtain a total loss value of the feature extraction model, and the feature extraction model is trained according to the total loss value. The statistics performed on the loss values obtained in the plurality of manners may be to calculate a sum of the plurality of loss values, calculate a mean value of the plurality of loss values, calculate a weighted sum of the plurality of loss values, or the like.

This embodiment of this disclosure is described by performing training on the feature extraction model once. However, in another embodiment, steps 1031 to 1034 may be repeatedly performed to train the feature extraction model for a plurality of iterations.

This embodiment of this disclosure is described by training the feature extraction model based on the loss value determined through the plurality of positive sample image combinations and the plurality of negative sample image combinations. However, in another embodiment, steps 1031 to 1034 are not required, and other manners may be used to train the feature extraction model according to the plurality of positive sample image combinations and the plurality of negative sample image combinations.

This embodiment of this disclosure is described by obtaining the loss value of the feature extraction model through the plurality of positive sample image combinations and the plurality of negative sample image combinations. In another embodiment, steps 1031 to 1033 are not required, and other manners may be used to determine the loss value of the feature extraction model according to the plurality of sample palm print features of the plurality of sample user identifiers.

This application is described by obtaining the loss value of the feature extraction model by generating the plurality of positive sample image combinations and the plurality of negative sample image combinations. However, in another embodiment, steps 1031 to 1033 are not required, and other manners may be used to obtain the loss value of the feature extraction model.

Optionally, the process of training the feature extraction model may further include the following steps 1 to 4:
1: Classify the sample palm print features of the sample palm images to obtain a predicted user identifier of each sample palm image.

The predicted user identifier is used to represent a user identifier predicted for the sample palm image, and the predicted user identifier may be any one of a plurality of sample user identifiers.
2: Determine the loss value of the feature extraction model according to a difference between predicted user identifiers of the plurality of sample palm images and the sample user identifiers of the plurality of sample palm images.

Since each sample palm image corresponds to a sample user identifier, it may be determined whether the predicted user identifier of each sample palm image is accurate, and the difference between the predicted user identifier of each sample palm image and the corresponding sample user identifier may be determined. The difference is used as the loss value of the feature extraction model, so that the feature extraction model can be adjusted through the loss value subsequently. In this case, the loss value of the feature extraction model may be referred to as a fourth loss value.

Since the predicted user identifier is obtained through the sample palm print feature of the sample palm image, if the sample palm print feature obtained by using the feature extraction model has high accuracy, the accuracy of the predicted user identifier is high; and if the sample palm print feature obtained by using the feature extraction model has low accuracy, the accuracy of the predicted user identifier is low. Therefore, the difference between the predicted user identifiers of the plurality of sample palm images and the sample user identifiers of the plurality of sample palm images may be used as the loss value for training the feature extraction model, so that a distinguishing degree between different palm print features extracted by the trained feature extraction model is high, thereby improving the accuracy of the feature extraction model.

This embodiment of this disclosure is described by classifying the sample palm print features of the sample palm images to determine the loss value of the feature extraction model. Optionally, the process of determining the loss value of the feature extraction model may further include: clustering the sample palm print features of the plurality of sample palm images to obtain a plurality of sample image sets, and determining the loss value of the feature extraction model according to differences of sample user identifiers to which a plurality of sample palm images in each sample palm image set belong. In this case, the loss value of the feature extraction model may be referred to as a fifth loss value.

The plurality of sample palm print features are clustered, and a plurality of similar sample palm print features are clustered, to obtain a sample palm image set formed by sample palm images of the plurality of similar sample palm print features, thereby obtaining a plurality of sample palm image sets. According to whether a plurality of sample palm images in each sample palm image set belong to a same sample user identifier, a difference of each sample palm image set is determined, thereby determining the loss value of the feature extraction model.

In the model training method provided in the embodiments of this disclosure, sample hand images of a plurality of sample user identifiers are obtained, a plurality of sample hand images of a same sample user identifier being acquired by using different types of devices; a palm extraction model is called to perform palm extraction on each sample hand image to obtain the sample palm images of the plurality of sample user identifiers; and the feature extraction model is trained according to the sample palm images of the plurality of sample user identifiers. The sample hand images of different sample user identifiers are obtained, and it is ensured that the plurality of hand images of each sample user identifier are acquired by different types of devices, thereby enriching the training samples. The feature extraction model is trained through the sample hand images acquired by different types of devices, so that the feature extraction model can perform feature extraction on hand images of various types of devices, which enhances the application range of the feature extraction model and improves the accuracy of the feature extraction model.

In the third manner and the fifth manner, the training process of the feature extraction model is divided into a plurality of training rounds, and target statistical values are respectively set for each training round, so that the feature extraction model can be trained step by step subsequently, implementing a method for training a model according to a step target distribution loss function. The accuracy of the feature extraction model can be gradually improved, thereby ensuring the stability of training the feature extraction model and improving the accuracy of the obtained feature extraction model.

Figure 14:
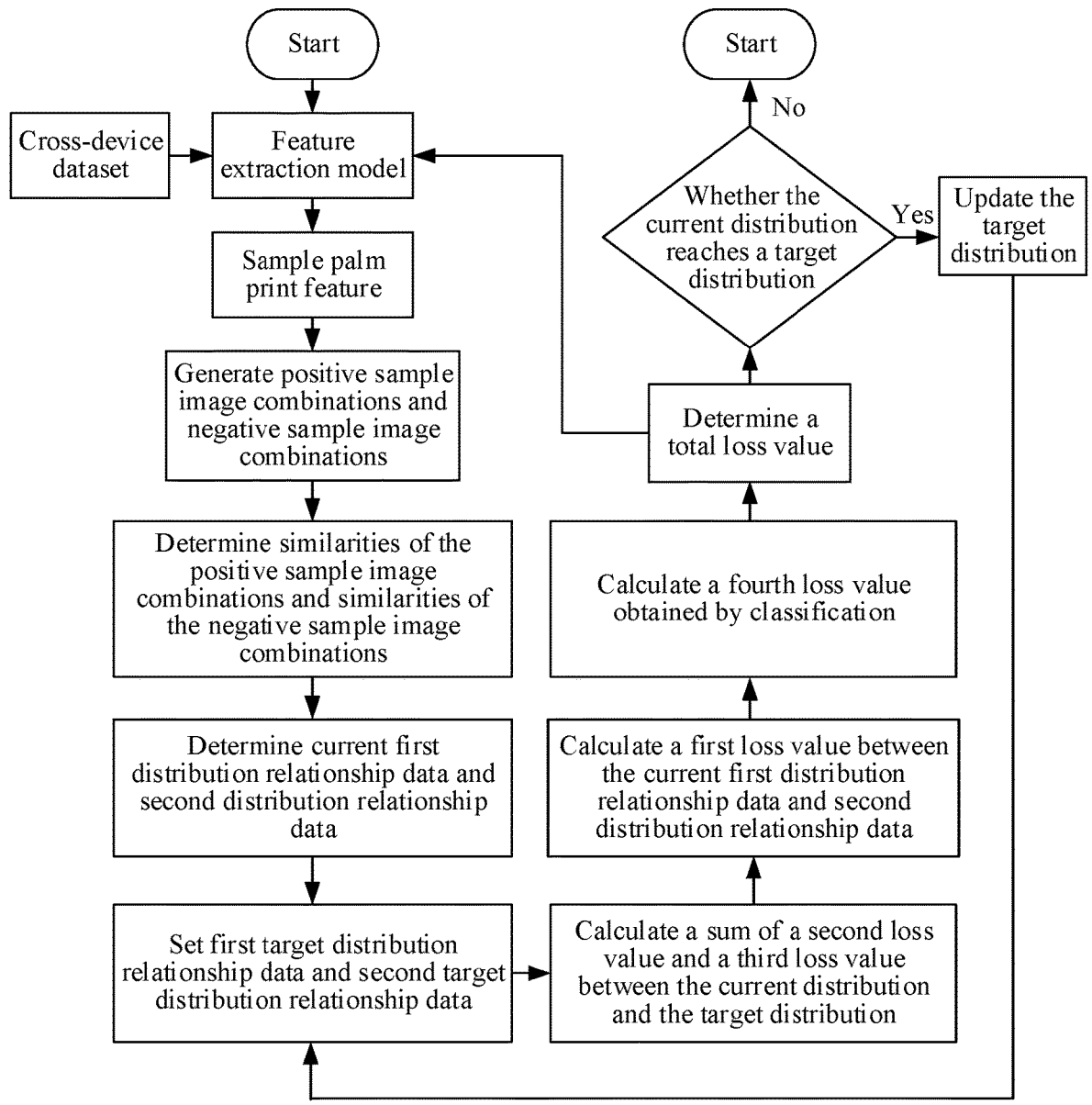
FIG. 14 is a flowchart of a model training method according to an embodiment of this disclosure.

FIG. 14 is a flowchart of a model training method according to an embodiment of this disclosure. As shown in FIG. 14, the method includes:
1: Obtain a cross-device dataset, the cross-device dataset including sample palm images acquired by different types of devices.
2: Obtain sample palm features of the sample palm images in the cross-device dataset through a feature extraction model.
3: Generate a plurality of positive sample image combinations and a plurality of negative sample image combinations according to the sample palm images in the cross-device dataset.
4: Determine similarities of the positive sample image combinations and similarities of the negative sample image combinations according to the sample palm features of the sample palm images, and respectively determine first distribution relationship data of the positive sample image combinations and second distribution relationship data of the negative sample image combinations according to the similarities of the plurality of positive sample image combinations and the similarities of the plurality of negative sample image combinations.

5: Set first target distribution relationship data for the positive sample image combinations, and set second target distribution relationship data for the negative sample image combinations.

6. Respectively determine a second loss value between current distribution relationship data of the positive sample image combinations and the target distribution relationship data, and a third loss value between current distribution relationship data and the target distribution relationship data of the negative sample image combinations according to the first distribution relationship data and the first target distribution relationship data of the positive sample image combinations, and the second distribution relationship data and the second target distribution relationship data of the negative sample image combinations, and determine a sum of the second loss value and the third loss value.

7. Determine a first loss value according to a mean value of the similarities of the current positive sample image combinations and a mean value of the similarities of the current negative sample image combinations.

8. Obtain a fourth loss value of the feature extraction model by classifying the sample palm features.

9. Determine a total loss value of the feature extraction model according to the first loss value, the sum of the second loss value and the third loss value, and the fourth loss value, and adjust the feature extraction model according to the total loss value.

10. Determine whether the current distribution of the positive sample image combinations and the negative sample image combinations reaches a target distribution; and if the target distribution is reached, adjust the target distribution according to a preset step value, and continue to train the feature extraction model; otherwise, stop training the feature extraction model.

Figure 15:
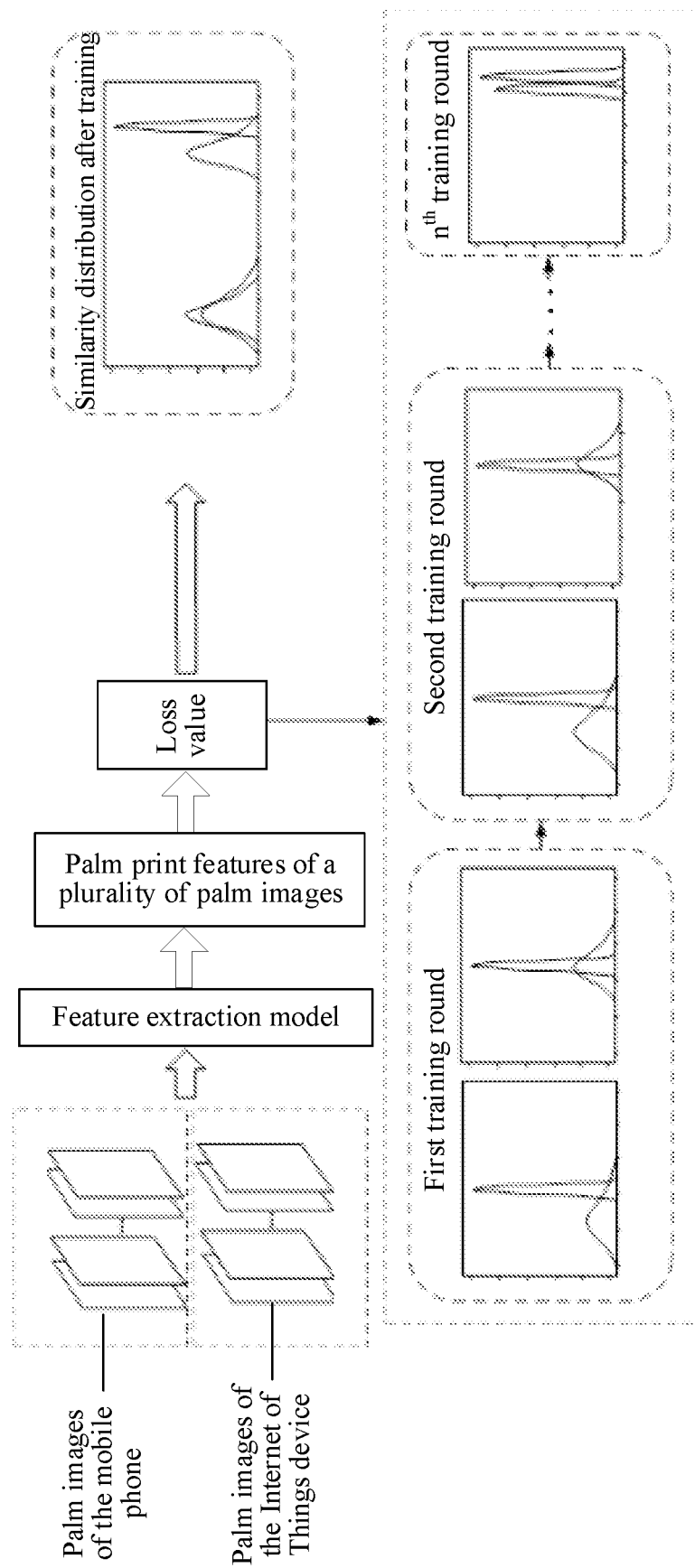
FIG. 15 is a flowchart of a model training method according to an embodiment of this disclosure.

As shown in FIG. 15, sample palm images acquired by a mobile phone and sample palm images acquired by an Internet of Things device are obtained; a feature extraction model is used to perform feature extraction on each sample palm image to obtain palm print features of the plurality of sample palm images; a loss value of the feature extraction model is determined according to the palm print features of the plurality of sample palm images; and the feature extraction model is iteratively trained for a plurality of training rounds according to set step target distribution relationship data.

In each training round, a result of adjusting the feature extraction model is that a mean value of first distribution relationship data corresponding to positive sample image combinations is not less than a mean value of first target distribution relationship data. After the plurality of training rounds, a result of adjusting the feature extraction model in the current training round is that the mean value of the first distribution relationship data corresponding to the positive sample image combinations is less than the mean value of the first target distribution relationship data, which indicates that the feature extraction model has reached an equilibrium state, and the training of the feature extraction model is stopped.

The trained feature extraction model performs feature extraction on the plurality of sample palm images, so that the obtained first distribution relationship data of the plurality of positive sample image combinations is similar to the first target distribution relationship data, the second distribution relationship data of the plurality of negative sample image combinations is similar to the second target distribution relationship data, and the first distribution relationship data of the plurality of positive sample image combinations and the second distribution relationship data of the plurality of negative sample image combinations are far apart.

The process of training the feature extraction model may be performed on various datasets. Table 1 shows a comparison between various datasets at present. As can be seen from Table 1, hand images in different datasets may be obtained in different acquisition manners, and quantities of hand images included in different datasets are different. In each dataset, each palm may correspond to a plurality of hand images, and types of acquisition devices of hand images corresponding to each dataset are different.

TABLE 1

| Dataset | Acquisition manner | Quantity of images | Quantity of palms | Type of acquisition device |
| --- | --- | --- | --- | --- |
| CASIA | Non-contact | 5502 | 624 | 1 |
| IITD | Non-contact | 2601 | 460 | 1 |
| PolyU | Non-contact | 1140 | 114 | 1 |
| TCD | Non-contact | 12000 | 600 | 2 |
| MPD | Mobile phone | 16000 | 400 | 2 |

Table 2 shows a comparison of accuracy of feature extraction models trained by using the model training method provided in the embodiments of this disclosure and methods of the related art on different cross-device palm print recognition datasets according to an embodiment of this disclosure. Table 3 shows a comparison of loss values of feature extraction models trained by using the model training method provided in the embodiments of this disclosure and methods of the related art on different cross-device palm print recognition datasets according to an embodiment of this disclosure. As shown in Table 2 and Table 3, both in terms of accuracy and loss values, the feature extraction model obtained through the step target distribution loss function (PTD Loss) used in the model training method provided in this application has a better effect than the feature extraction models obtained by using other methods of the related art.

TABLE 2

| Dataset | Basic network model | Basic convolutional network model + relative entropy loss | Cross-modal person re-identification method | Basic convolutional network model + direct device target distribution loss function | Model training method of this application |
| --- | --- | --- | --- | --- | --- |
| MOHI | 84.37 | 89.41 | 89.57 | 89.70 | 90.34 |
| WEHI | 65.35 | 75.36 | 76.43 | 76.22 | 77.63 |
| MOHI-WEHI | 34.24 | 15.50 | 58.31 | 58.95 | 60.38 |

TABLE 2-continued

| Dataset | Basic network model | Basic convolutional network model + relative entropy loss | Cross-modal person re-identification method | Basic convolutional network model + direct device target distribution loss function | Model training method of this application |
|---|---|---|---|---|---|
| MPD-TCD, s TCD | 99.74 | 99.76 | 99.87 | 99.80 | 99.86 |
| MPD-TCD, s MPD | 96.85 | 97.97 | 98.91 | 98.08 | 99.87 |
| MPD-TCD | 95.00 | 97.71 | 98.03 | 97.72 | 99.10 |

TABLE 3

| Dataset | Basic network model | Basic convolutional network model + relative entropy loss | Cross-modal person re-identification method | Basic convolutional network model + direct device target distribution loss function | Model training method of this application |
|---|---|---|---|---|---|
| MOHI | 6.84 | 6.48 | 6.15 | 6.13 | 5.97 |
| WEHI | 12.73 | 90.8 | 8.24 | 8.28 | 8.08 |
| MOHI-WEHI | 42.64 | 22.98 | 20.22 | 20.15 | 18.36 |
| MPD-TCD, s TCD | 0.18 | 0.14 | 0.05 | 0.06 | 0.02 |
| MPD-TCD, s MPD | 1.30 | 0.94 | 0.62 | 0.87 | 0.30 |
| MPD-TCD | 2.97 | 1.90 | 1.47 | 1.60 | 1.22 |

Table 4 shows accuracy of feature extraction models trained by training the feature extraction models on different datasets by using the model training method provided in the embodiments of this disclosure and methods of the related art. Table 5 shows loss values of feature extraction models trained by training the feature extraction models on different datasets by using the model training method provided in the embodiments of this disclosure and methods of the related art. As can be seen from Table 4, even on different datasets, the feature extraction model trained through the step target distribution loss function used in the model training method provided in the embodiments of this disclosure has high accuracy. As can be seen from Table 5, even on different datasets, the feature extraction model trained through the step target distribution loss function used in the model training method provided in the embodiments of this disclosure has a low loss value. Therefore, the feature extraction model trained by using the model training method provided in the embodiments of this disclosure has a good effect.

TABLE 4

| Training method | CASIA | IITD | PolyU | TCD | MPD |
|---|---|---|---|---|---|
| PalmNet | 97.17 | 97.31 | 99.5 | 99.89 | 91.88 |
| FERNet | 97.65 | 99.61 | 99.77 | 98.63 | — |
| VGG-16 | 97.80 | 93.64 | — | 98.46 | — |
| GoogLeNet | 93.84 | 96.22 | 68.59 | — | — |
| DTD Loss | 99.74 | 100 | 100 | 100 | 99.58 |
| Model training method of this application | 99.85 | 100 | 100 | 100 | 99.78 |

TABLE 5

| Training method | CASIA | IITD | PolyU | TCD | MPD |
|---|---|---|---|---|---|
| PalmNet | 3.21 | 3.83 | 0.39 | 0.40 | 6.22 |
| FERNet | 0.743 | 0.76 | 0.15 | — | — |
| VGG-16 | 7.86 | 7.44 | — | 2.86 | — |
| GoogLeNet | 1.65 | 1.97 | 11.19 | — | — |
| DTD Loss | 0.42 | 0.24 | 0.07 | 0.06 | 0.62 |
| Model training method of this application | 0.37 | 0.20 | 0.05 | 0.04 | 0.43 |

Table 6 shows a comparison of accuracy and loss values of feature extraction models obtained by training the feature extraction models in a case that datasets used for training and datasets used for testing are different by using the model training method provided in the embodiments of this disclosure and methods of the related art. As can be seen from Table 6, for any model training method, when the datasets used for training and the datasets used for testing are different, and the accuracy and loss values of the obtained feature extraction models are different. The feature extraction model obtained by using the model training method provided in the embodiments of this disclosure has high accuracy and a low loss value. Therefore, the feature extraction model trained by using the model training method provided in the embodiments of this disclosure has a good effect.

TABLE 6

| Training method | Training dataset | Test dataset | Accuracy | Loss value |
|---|---|---|---|---|
| C-LMCL | TCD | PolyU | 99.93 | 0.58 |
| ArcPalm-Res | TCD | PolyU | 98.63 | 0.83 |
| Model training method of this application | TCD | PolyU | 99.93 | 0.56 |
| C-LMCL | PolyU | TCD | 98.72 | 1.46 |
| ArcPalm-Res | PolyU | TCD | 97.09 | 1.76 |

TABLE 6-continued

| Training method | Training dataset | Test dataset | Accuracy | Loss value |
|---|---|---|---|---|
| Model training method of this application | PolyU | TCD | 98.74 | 1.43 |

Figure 16:
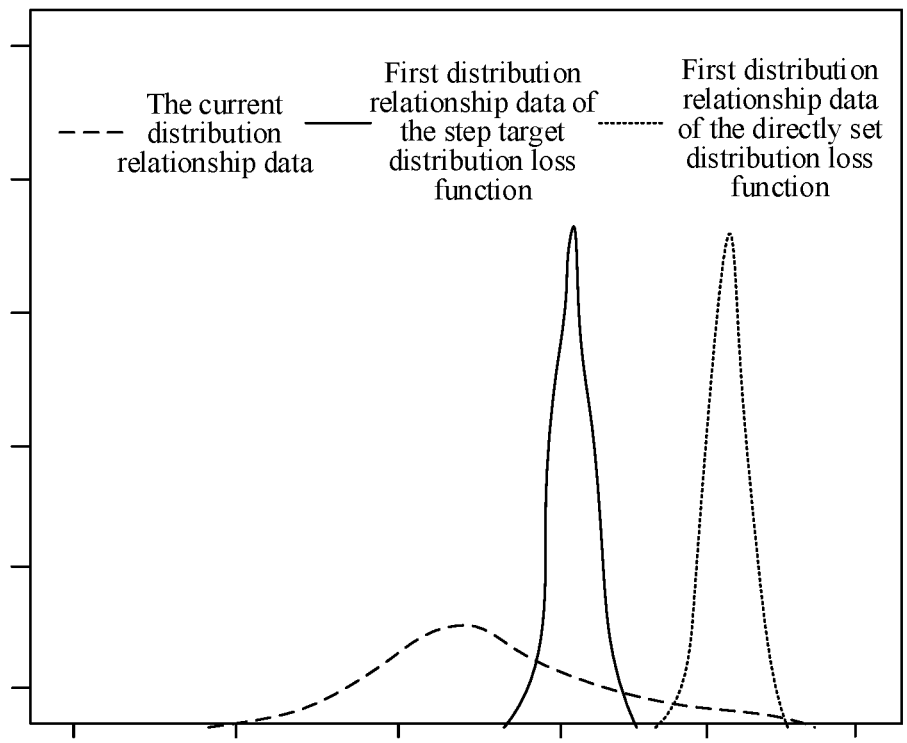
FIG. 16 is a schematic diagram of first distribution relationship data corresponding to different loss functions according to an embodiment of this disclosure.

As shown in FIG. 16, FIG. 16 includes first distribution relationship data of the current positive sample image combination, first distribution relationship data obtained by using the step target distribution loss function, and first distribution relationship data obtained by using a directly set target distribution loss function. As can be seen from FIG. 16, the first distribution relationship data obtained by using the step target distribution loss function and the first distribution relationship data of the current positive sample image combination have more overlapping parts, and the first distribution relationship data obtained by using the directly set target distribution loss function and the first distribution relationship data of the current positive sample image combination have less overlapping parts, which indicates that a difference between the first distribution relationship data obtained by using the step target distribution loss function and the first distribution relationship data of the current positive sample image combination is small. Therefore, when the feature extraction model is adjusted according to the difference, the accuracy of the feature extraction model can be improved, so that the first distribution relationship data of the positive sample image combination can reach the first target distribution relationship data of the device, and distortion of the feature extraction model can be avoided, which results in inaccuracy of the feature extraction model.

Figure 17:
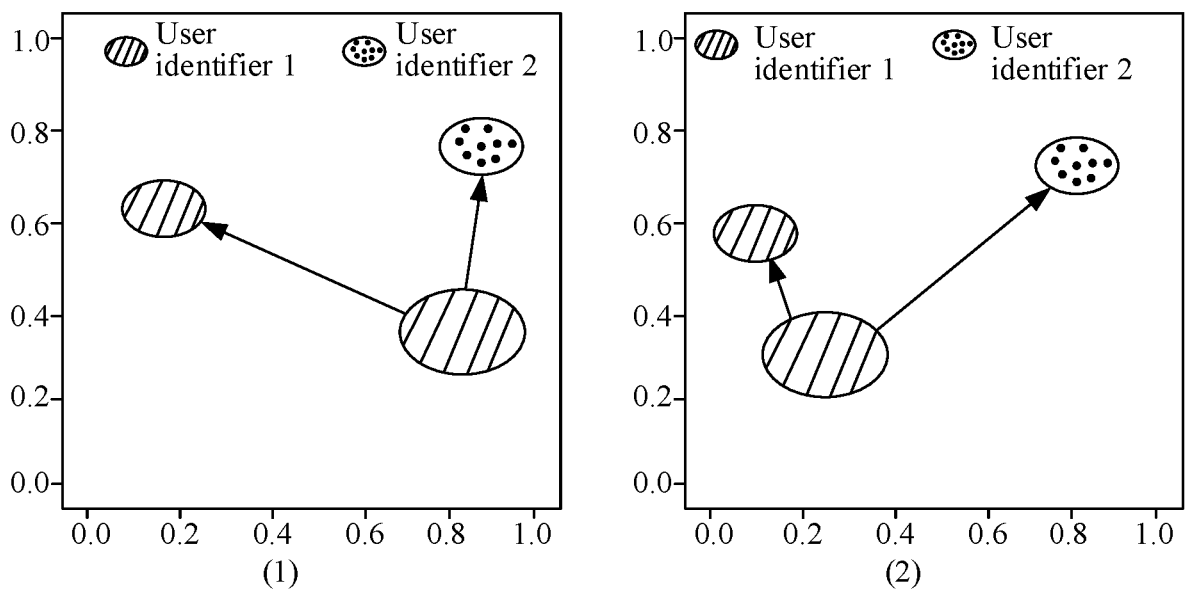
FIG. 17 is a schematic diagram of a palm print feature distribution according to an embodiment of this disclosure.

As shown in FIG. 17, figures (1) and (2) both show distributions of palm print features extracted by calling feature extraction models. The feature extraction model called for extracting palm print features in figure (1) is obtained through training by using the directly set target distribution loss function, and the feature extraction model called for extracting palm print features in figure (2) is obtained through training by using a step target distribution loss function. In figure (1), a distance between two palm print features belonging to user 1 is far, and a distance between a palm print feature belonging to user 1 and a palm print feature belonging to user 2 is close, which indicates that the feature extraction model obtained through training by using the directly set target distribution loss function has a poor capability for distinguish palm print features of different users. In figure (2), a distance between two palm print features belonging to user 1 is close, and a distance between a palm print feature belonging to user 1 and a palm print feature belonging to user 2 is far, which indicates that the feature extraction model obtained by using the step target distribution loss function has a good capability for distinguish palm print features of different users. Therefore, by using the method for training a feature extraction model provided in the embodiments of this disclosure, the obtained feature extraction model can extract palm print features of different user identifiers, and has a good distinguishing capability and high accuracy.

Figure 18:
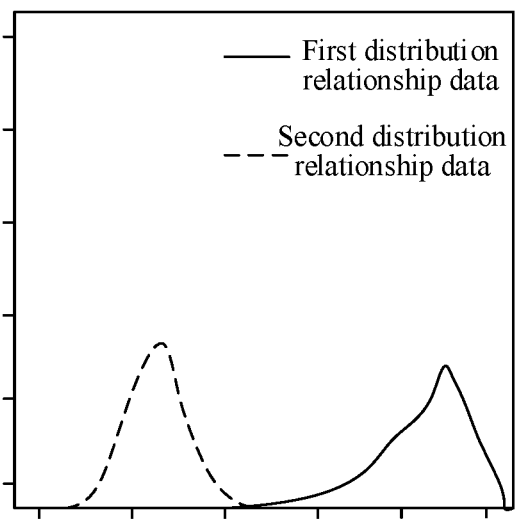
FIG. 18 is a schematic diagram of distribution relationship data according to an embodiment of this disclosure.
Figure 18:
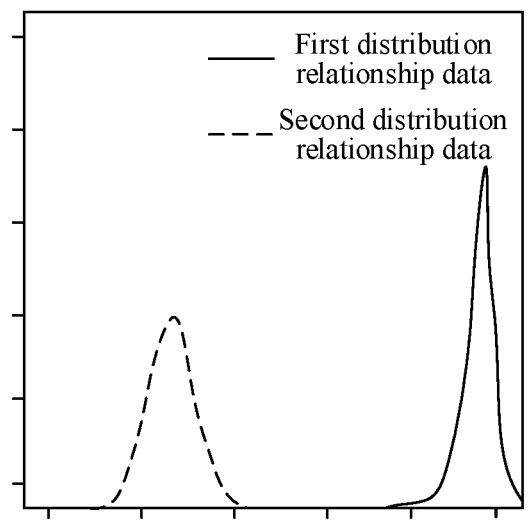
Figure 18:
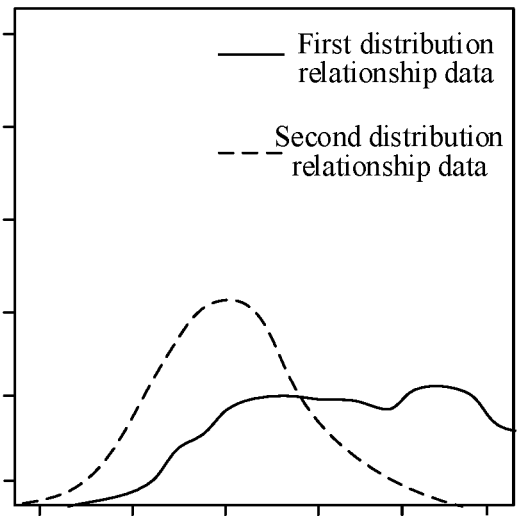
Figure 18:
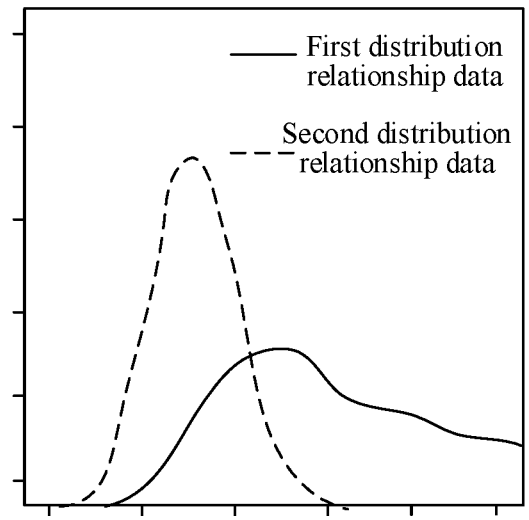

As shown in FIG. 18, in a MOHI-WEHI cross-device dataset, a larger overlapping region of first distribution relationship data and second distribution relationship data obtained through a feature extraction model in the related art and the feature extraction model provided in this application indicates more recognition errors of the feature extraction models. As can be learned by comparing figures (1) and (2), and comparing figures (3) and (4), whether in a training stage or in a testing stage, a distance between the first distribution relationship data and the second distribution relationship data obtained through the feature extraction model of this application is large, which indicates that the feature extraction model of this application can distinguish palm images of different user identifiers of different devices.

Figure 19:
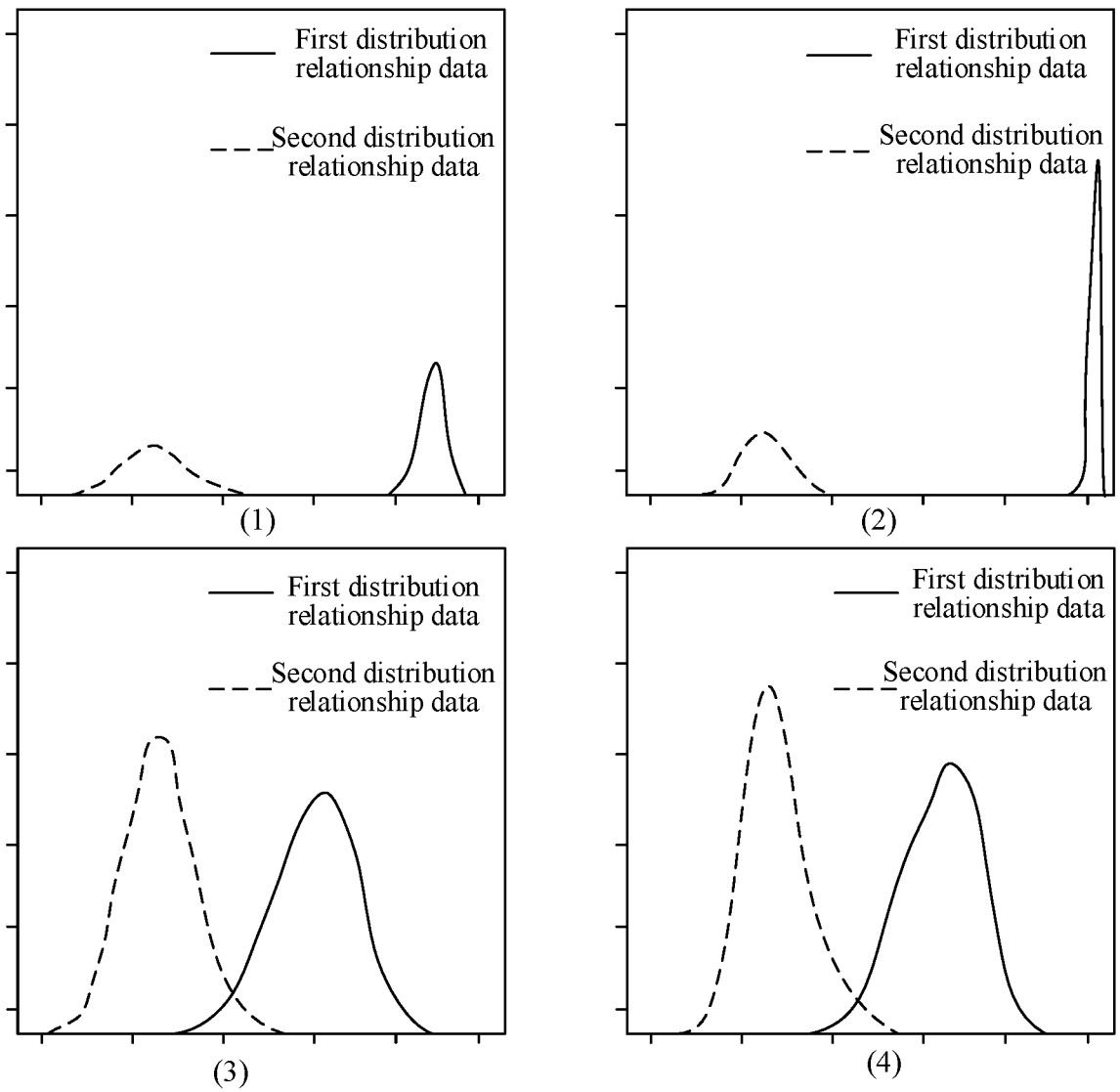
FIG. 19 is a schematic diagram of distribution relationship data according to an embodiment of this disclosure.

FIG. 19 shows first distribution relationship data and second distribution relationship data obtained through a feature extraction model in the related art and the feature extraction model provided in this application in an MPD-TCD cross-device dataset. As can be learned by comparing figures (1) and (2), and comparing figures (3) and (4), whether in a training stage or in a testing stage, a distance between the first distribution relationship data and the second distribution relationship data obtained through the feature extraction model of this application is large, which indicates that the feature extraction model of this application can distinguish palm images of different user identifiers of different devices.

Figure 20:
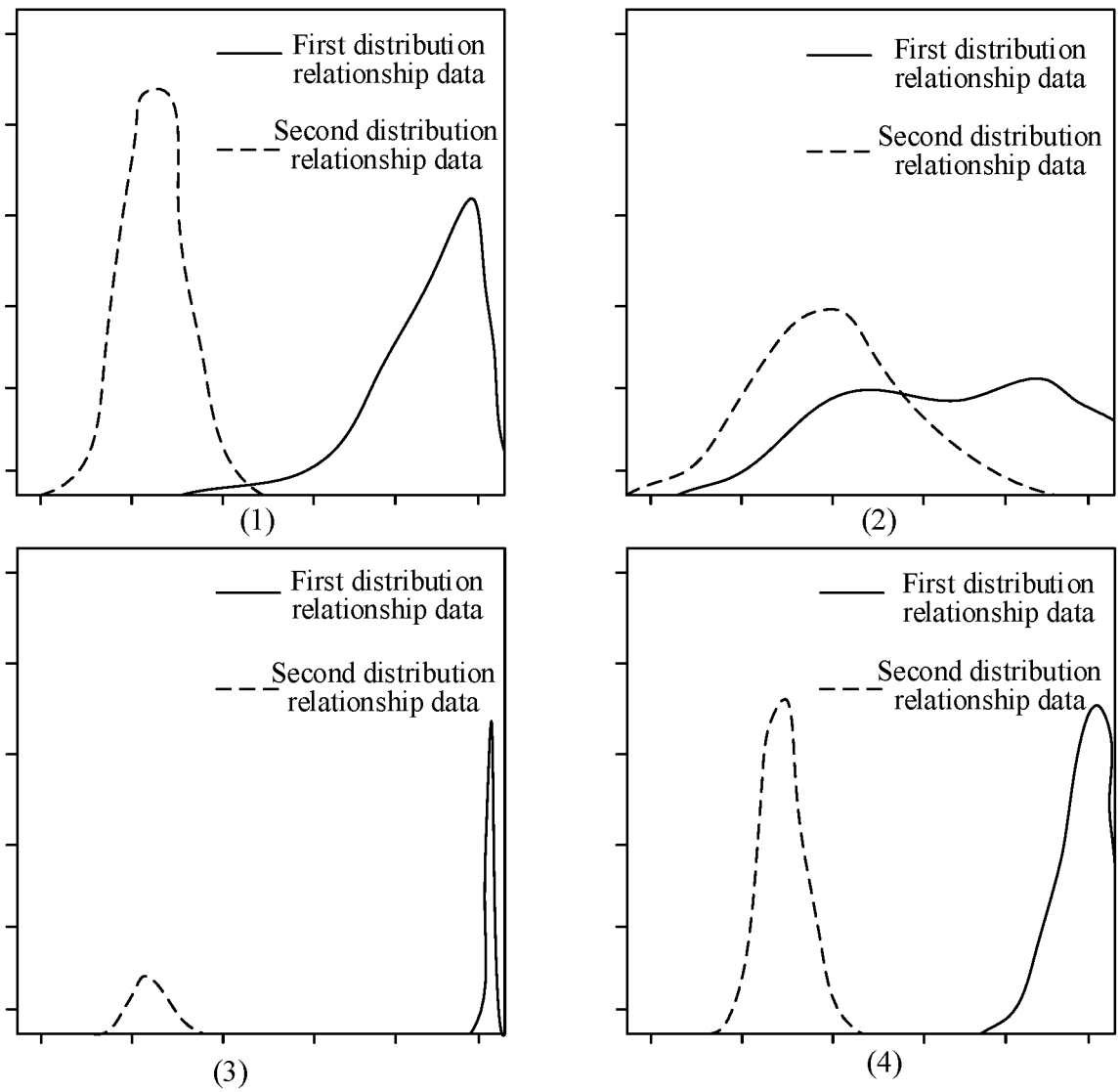
FIG. 20 is a schematic diagram of distribution relationship data according to an embodiment of this disclosure.

As shown in FIG. 20, figures (1) and (2) respectively show distributions of first distribution relationship data and second distribution relationship data obtained through trained feature extraction models on a training set and a test set of the MOHI-WEHI cross-device dataset. Figures (3) and (4) respectively show distributions of first distribution relationship data and second distribution relationship data obtained through trained feature extraction models on a training set and a test set of the same TCD device dataset.

Figure 21:
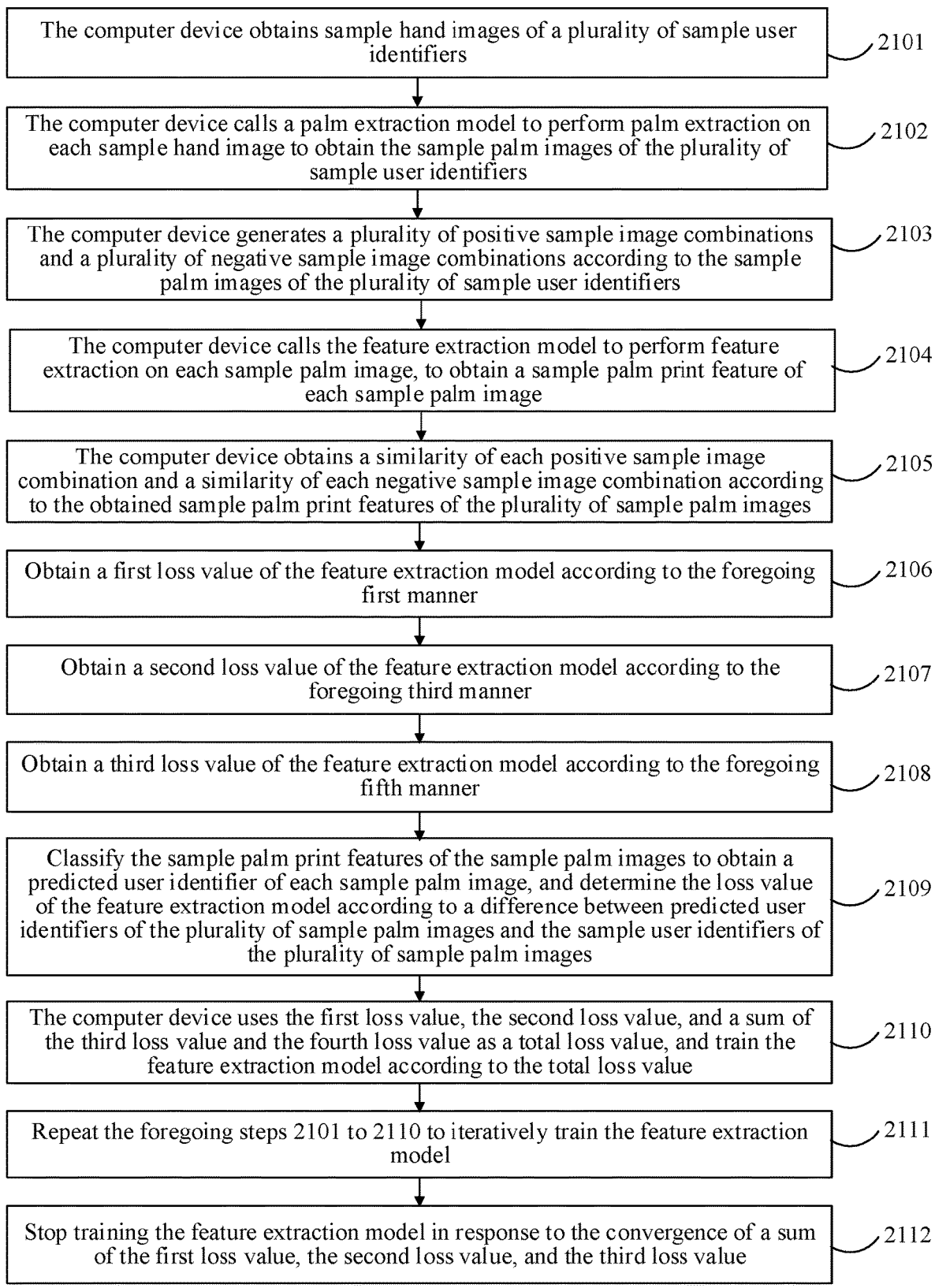
FIG. 21 is a flowchart of a model training method according to an embodiment of this disclosure.

FIG. 21 is a flowchart of a method for training a feature extraction model according to an embodiment of this disclosure. The method is applicable to a computer device. As shown in FIG. 21, the method includes:

2101: The computer device obtains sample hand images of a plurality of sample user identifiers.

2102: The computer device calls a palm extraction model to perform palm extraction on each sample hand image to obtain the sample palm images of the plurality of sample user identifiers.

2103: The computer device generates a plurality of positive sample image combinations and a plurality of negative sample image combinations according to the sample palm images of the plurality of sample user identifiers.

2104: The computer device calls the feature extraction model to perform feature extraction on each sample palm image, to obtain a sample palm print feature of each sample palm image.

2105: The computer device obtains a similarity of each positive sample image combination and a similarity of each negative sample image combination according to the obtained sample palm print features of the plurality of sample palm images.

2106. Obtain a first loss value of the feature extraction model according to the foregoing first manner.

2107. Obtain a second loss value of the feature extraction model according to the foregoing third manner.

2108. Obtain a third loss value of the feature extraction model according to the foregoing fifth manner.

2109: Classify the sample palm print features of the sample palm images to obtain a predicted user identifier of each sample palm image, and determine the loss value of the feature extraction model according to a difference between predicted user identifiers of the plurality of sample palm images and the sample user identifiers of the plurality of sample palm images.

2110: The computer device uses the first loss value, the second loss value, and a sum of the third loss value and the fourth loss value as a total loss value, and train the feature extraction model according to the total loss value.

In a possible implementation, the first loss value $\text{Loss}_{mean}$, the second loss value $D_{KL}(T_{sim}^1 \| C_{sim}^1)$, the third loss value $D_{KL}(T_{sim}^2 \| C_{sim}^2)$, the fourth loss value $\text{LOSS}_{Arcface}$, and the total loss value Loss meet the following relationship:

$$\text{Loss}_{KL} = \alpha_1 D_{KL}(T_{sim}^P \| C_{sim}^P) + \alpha_2 D_{KL}(T_{sim}^N \| C_{sim}^N)$$

$$\text{Loss}_{PDT} = \text{Loss}_{KL} + \text{Loss}_{mean}$$

$$\text{Loss} = \beta \text{Loss}_{PDT} + \gamma \text{Loss}_{Arcface}$$

where $\text{Loss}_{KL}$ is used to represent a loss value obtained by the weighted summation of the second loss value $D_{KL}(T_{sim}^1 \| C_{sim}^1)$ and the third loss value $D_{KL}(T_{sim}^2 \| C_{sim}^2)$; $\alpha_1$ and $\alpha_2$ are both weight parameters, and may be any constant, for example, $\alpha_1$ is 1, and $\alpha_2$ is 0.1; and $\beta$ and $\gamma$ are both weight parameters, and may be any constant, for example, $\beta$ is 0.5, and $\gamma$ is 1.

Figure 22:
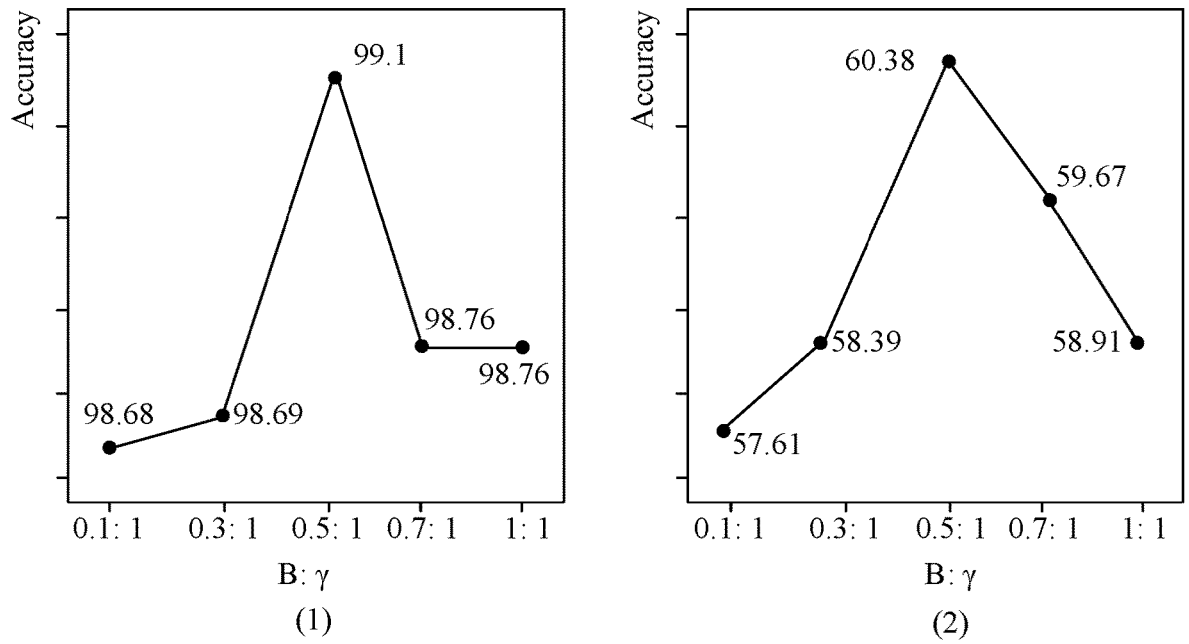
FIG. 22 is a schematic diagram showing a relationship between weight parameters and accuracy according to an embodiment of this disclosure.

As shown in FIG. 22, figures (1) and (2) respectively show accuracy of a feature extraction models obtained by training the feature extraction model on different datasets with different ratios of $\beta$ to $\gamma$. It can be seen from the figures that on different datasets, only when $\beta$ is 0.5 and $\gamma$ is 1, the accuracy of the feature extraction model is high.

2111. Repeat the foregoing steps 2101 to 2110 to iteratively train the feature extraction model.

2112. Stop training the feature extraction model in response to the convergence of a sum of the first loss value, the second loss value, and the third loss value.

Since the sum of the first loss value, the second loss value, and the third loss value converges, a difference between similarity distributions of positive sample image combinations and similarity distributions of negative sample image combinations of the current training round reaches an equilibrium state, that is, the distinguishing degree between palm features of different palm images extracted by the feature extraction model no longer increases, which indicates that the feature extraction model has reached an equilibrium state, and the training of the feature extraction model is stopped.

Figure 23:
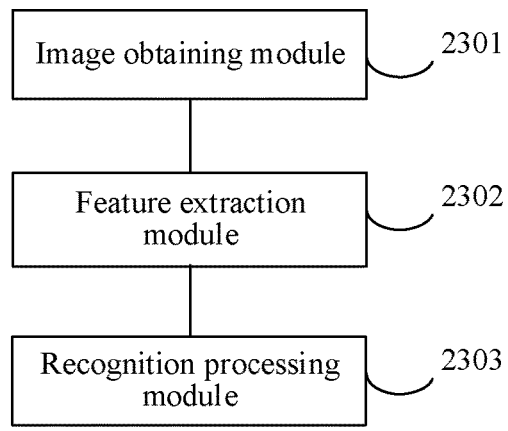
FIG. 23 is a schematic structural diagram of a palm print recognition apparatus according to an embodiment of this disclosure.

FIG. 23 is a schematic structural diagram of a palm print recognition apparatus according to an embodiment of this disclosure. In this disclosure, a unit and a module may be hardware such as a combination of electronic circuitries; firmware; or software such as computer instructions. The unit and the module may also be any combination of hardware, firmware, and software. In some implementation, a unit may include at least one module. As shown in FIG. 23, the apparatus includes:

an image obtaining module 2301, configured to obtain a target hand image, the target hand image including a palm;

a feature extraction module 2302, configured to call a feature extraction model to perform feature extraction according to the target hand image, to obtain a target palm print feature, the feature extraction model being obtained through training according to sample palm print features of a plurality of sample user identifiers, each sample user identifier including a plurality of sample palm print features, the plurality of sample palm print features being obtained by respectively performing feature extraction on a plurality of corresponding sample hand images of the sample user identifier, and a plurality of sample hand images of a same sample user identifier being acquired by using different types of devices; and a recognition processing module 2303, configured to perform recognition processing on the target palm print feature according to a plurality of preset palm print features stored and user identifiers corresponding to the preset palm print features, to determine a target user identifier of the target palm print feature.

In a possible implementation, the apparatus further includes a palm extraction module 2304.

The palm extraction module 2304 is configured to perform palm extraction on the target hand image to obtain a target palm image of the target hand image.

The feature extraction module 2302 is further configured to call the feature extraction model to perform feature extraction on the target palm image, to obtain a target palm print feature.

Figure 24:
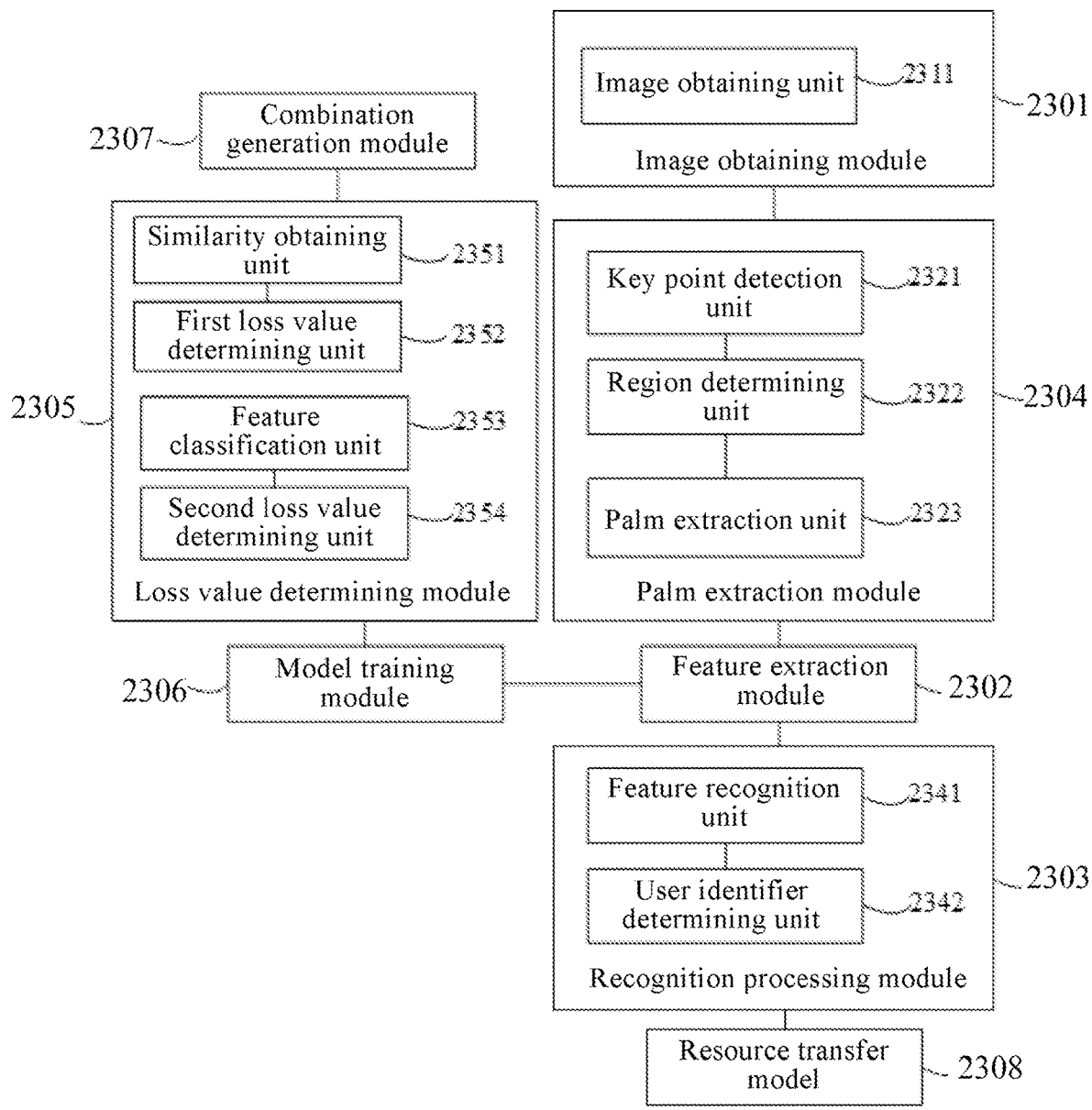
FIG. 24 is a schematic structural diagram of a palm print recognition apparatus according to an embodiment of this disclosure.

In a possible implementation, as shown in FIG. 24, the apparatus further includes:

an image obtaining module 2301, further configured to obtain sample hand images of a plurality of sample user identifiers;

a palm extraction module 2304, further configured to perform palm extraction on each sample hand image to obtain the sample palm images of the plurality of sample user identifiers;

a feature extraction module 2302, further configured to call the feature extraction model to perform feature extraction on each sample palm image, to obtain a sample palm print feature of each sample palm image;

a loss value determining module 2305, configured to determine a loss value of the feature extraction model according to the sample palm print features of the plurality of sample user identifiers; and a model training module 2306, configured to train the feature extraction model according to the loss value.

In another possible implementation, as shown in FIG. 24, the apparatus further includes:

a combination generation module 2307, configured to generate a plurality of positive sample image combinations and a plurality of negative sample image combinations according to the sample palm images of the plurality of sample user identifiers, the positive sample image combination including two sample palm images belonging to a same sample user identifier, and the negative sample image combination including two sample palm images respectively belonging to different sample user identifiers; and the loss value determining module 2305 includes:

a similarity obtaining unit 2351, configured to obtain a similarity of each positive sample image combination and a similarity of each negative sample image combination according to the obtained sample palm print features of the plurality of sample palm images, the similarity of the positive sample image combination representing a similarity between sample palm print features of two sample palm images in the positive sample image combination, and the similarity of the negative sample image combination representing a similarity between sample palm print features of two sample palm images in the negative sample image combination; and a first loss value determining unit 2352, configured to determine the loss value of the feature extraction model according to the similarities of the plurality of positive sample image combinations and the similarities of the plurality of negative sample image combinations.

In another possible implementation, the first loss value determining unit 2352 is configured to perform statistics on the similarities of the plurality of positive sample image combinations to obtain a first statistical value corresponding to the plurality of positive sample image combinations; perform statistics on the similarities of the plurality of negative sample image combinations to obtain a second statistical value corresponding to the plurality of negative sample image combinations; and determine a difference between the second statistical value and the first statistical value as the loss value of the feature extraction model.

In another possible implementation, the first loss value determining unit 2352 is configured to determine first distribution relationship data according to the similarities of the plurality of positive sample image combinations, the first distribution relationship data representing a distribution of the similarities of the plurality of positive sample image combinations; obtain a mean value of the similarities of the plurality of positive sample image combinations to obtain an original statistical value corresponding to the plurality of positive sample image combinations; add a first preset value to the original statistical value to obtain a target statistical value corresponding to the plurality of positive sample image combinations; determine first target distribution relationship data by using the target statistical value as a mean value and a second preset value as a standard deviation; and determine the loss value of the feature extraction model according to a difference between the first distribution relationship data and the first target distribution relationship data.

In another possible implementation, the first loss value determining unit 2352 is configured to determine first distribution relationship data according to similarities of a plurality of positive sample image combinations in a first training round, the first distribution relationship data representing a distribution of the similarities of the plurality of positive sample image combinations, and sample hand images used in a plurality of training rounds of the feature extraction model being different; obtain a mean value of the similarities of the plurality of positive sample image combinations in the first training round to obtain an original statistical value corresponding to the plurality of positive sample image combinations; add a first preset value to a target statistical value corresponding to a plurality of positive sample image combinations in a second training round, to obtain a target statistical value corresponding to the plurality of positive sample image combinations in the first training round, the second training round being a previous training round of the first training round; determine first target distribution relationship data by using the target statistical value corresponding to the plurality of positive sample image combinations in the first training round as a mean value and a second preset value as a standard deviation; and determine the loss value of the feature extraction model according to a difference between the first distribution relationship data and the first target distribution relationship data.

In another possible implementation, the first loss value determining unit 2352 is configured to determine second distribution relationship data according to similarities of the plurality of negative sample image combinations, the second distribution relationship data representing a distribution of the similarities of the plurality of negative sample image combinations; obtain a mean value of the similarities of the plurality of negative sample image combinations to obtain an original statistical value corresponding to the plurality of negative sample image combinations; subtract a first preset value from the original statistical value to obtain a target statistical value corresponding to the plurality of negative sample image combinations; determine second target distribution relationship data by using the target statistical value as a mean value and a second preset value as a standard deviation; and determine the loss value of the feature extraction model according to a difference between the second distribution relationship data and the second target distribution relationship data.

In another possible implementation, the first loss value determining unit 2352 is configured to determine second distribution relationship data according to similarities of a plurality of negative sample image combinations in a first training round, the second distribution relationship data representing a distribution of the similarities of the plurality of negative sample image combinations, and sample hand images used in a plurality of training rounds of the feature extraction model being different; obtain a mean value of the similarities of the plurality of negative sample image combinations in the first training round to obtain an original statistical value corresponding to the plurality of negative sample image combinations; subtract a first preset value from a target statistical value corresponding to a plurality of negative sample image combinations in a second training round, to obtain a target statistical value corresponding to the plurality of negative sample image combinations in the first training round, the second training round being a previous training round of the first training round; determine second target distribution relationship data by using the target statistical value corresponding to the plurality of negative sample image combinations in the first training round as a mean value and a second preset value as a standard deviation; and determine the loss value of the feature extraction model according to a difference between the second distribution relationship data and the second target distribution relationship data.

In another possible implementation, as shown in FIG. 24, the loss value determining module 2305 includes:
  a feature classification unit 2353, configured to classify the sample palm print features of the sample palm images to obtain a predicted user identifier of each sample palm image; and
  a second loss value determining unit 2354, configured to determine the loss value of the feature extraction model according to a difference between predicted user identifiers of the plurality of sample palm images and the sample user identifiers of the plurality of sample palm images.

In another possible implementation, the palm extraction module 2304 is further configured to call the palm extraction model to perform palm extraction on the target hand image to obtain a target palm image of the target hand image.

In another possible implementation, as shown in FIG. 24, the palm extraction module 2304 includes:
  a key point detection unit 2321, configured to perform palm key point detection on the target hand image to obtain at least one palm key point in the target hand image;
  a region determining unit 2322, configured to determine a target region where the palm is located in the target hand image according to the at least one palm key point; and
  a palm extraction unit 2323, configured to perform palm extraction on the target region of the target hand image to obtain a target palm image.

In another possible implementation, the at least one palm key point includes a first palm key point, a second palm key point, and a third palm key point, and the second palm key point is located between the first palm key point and the third palm key point; and the region determining unit 2322 is configured to use a product of a distance between the first palm key point and the third palm key point and a third preset value as a first distance;

determine a fourth palm key point, where a distance between the fourth palm key point and the second palm key point is equal to the first distance, and a straight line formed by the first palm key point and the third palm key point is perpendicular to a straight line formed by the second palm key point and the fourth palm key point; use a product of the distance between the first palm key point and the third palm key point and a fourth preset value as a second distance; and determine a square target region with the fourth palm key point as a center of the target region and the second distance as a side length of the target region, or determine a circular target region with the fourth palm key point as the center of the target region and the second distance as a radius of the target region.

In another possible implementation, as shown in FIG. 24, the recognition processing module 2303 includes:

a feature recognition unit 2341, configured to identify, according to similarities between the target palm print feature and each preset palm print feature, a preset palm print feature with a largest similarity to the target palm print feature among the plurality of preset palm print features as a similar palm print feature; and a user identifier determining unit 2342, configured to determine a user identifier corresponding to the similar palm print feature as a target user identifier.

In another possible implementation, as shown in FIG. 24, the image obtaining module 2301 includes:

an image obtaining unit 2311, configured to acquire a target hand image in response to a resource transfer request; and the apparatus further includes:

a resource transfer model 2308, configured to transfer resources of the target user identifier based on the resource transfer request.

Figure 25:
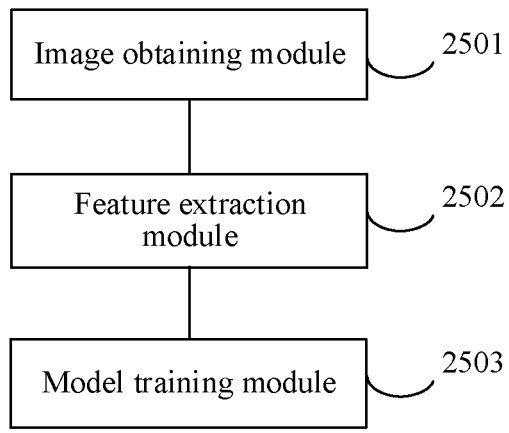
FIG. 25 is a schematic structural diagram of a model training apparatus according to an embodiment of this disclosure.

FIG. 25 is a schematic structural diagram of an apparatus for training a feature extraction model according to an embodiment of this disclosure. As shown in FIG. 25, the apparatus includes:

an image obtaining module 2501, configured to obtain sample hand images of a plurality of sample user identifiers, a plurality of sample hand images of a same sample user identifier being acquired by using different types of devices;

a feature extraction module 2502, configured to call a feature extraction model to perform feature extraction according to the sample hand images, to obtain sample palm print features; and a model training module 2503, configured to train the feature extraction model according to the sample palm print features of the plurality of sample user identifiers.

In a possible implementation, the apparatus further includes a palm extraction module.

The palm extraction module is configured to perform palm extraction on each sample hand image to obtain the sample palm images of the plurality of sample user identifiers.

The feature extraction module 2502 is further configured to call the feature extraction model to perform feature extraction on a sample palm image of each sample user identifier, to obtain a sample palm print feature of each sample palm image.

In a possible implementation, the apparatus further includes:

a loss value determining module, configured to determine a loss value of the feature extraction model according to the sample palm print features of the plurality of sample user identifiers; and the model training module 2503 is configured to train the feature extraction model according to the loss value.

In a possible implementation, in a case that the sample palm print features are obtained by performing feature extraction on each sample palm image, the apparatus further includes:

a combination generation module, configured to generate a plurality of positive sample image combinations and a plurality of negative sample image combinations according to the sample palm images of the plurality of sample user identifiers, the positive sample image combination including two sample palm images belonging to a same sample user identifier, and the negative sample image combination including two sample palm images respectively belonging to different sample user identifiers; and the loss value determining module includes:

a similarity obtaining unit, configured to obtain a similarity of each positive sample image combination and a similarity of each negative sample image combination according to the obtained sample palm print features of the plurality of sample palm images, the similarity of the positive sample image combination representing a similarity between sample palm print features of two sample palm images in the positive sample image combination, and the similarity of the negative sample image combination representing a similarity between sample palm print features of two sample palm images in the negative sample image combination; and a first loss value determining unit, configured to determine the loss value of the feature extraction model according to the similarities of the plurality of positive sample image combinations and the similarities of the plurality of negative sample image combinations.

In another possible implementation, the first loss value determining unit is configured to perform statistics on the similarities of the plurality of positive sample image combinations to obtain a first statistical value corresponding to the plurality of positive sample image combinations; perform statistics on the similarities of the plurality of negative sample image combinations to obtain a second statistical value corresponding to the plurality of negative sample image combinations; and determine a difference between the second statistical value and the first statistical value as the loss value of the feature extraction model.

In another possible implementation, the first loss value determining unit is configured to determine first distribution relationship data according to the similarities of the plurality of positive sample image combinations, the first distribution relationship data representing a distribution of the similarities of the plurality of positive sample image combinations; obtain a mean value of the similarities of the plurality of positive sample image combinations to obtain an original statistical value corresponding to the plurality of positive sample image combinations; add a first preset value to the original statistical value to obtain a target statistical value corresponding to the plurality of positive sample image combinations; determine first target distribution relationship data by using the target statistical value as a mean value and a second preset value as a standard deviation; and determine the loss value of the feature extraction model according to a difference between the first distribution relationship data and the first target distribution relationship data.

In another possible implementation, the first loss value determining unit is configured to determine first distribution relationship data according to similarities of a plurality of positive sample image combinations in a first training round, the first distribution relationship data representing a distribution of the similarities of the plurality of positive sample image combinations, and sample hand images used in a plurality of training rounds of the feature extraction model being different; obtain a mean value of the similarities of the plurality of positive sample image combinations in the first training round to obtain an original statistical value corresponding to the plurality of positive sample image combinations; add a first preset value to a target statistical value corresponding to a plurality of positive sample image combinations in a second training round, to obtain a target statistical value corresponding to the plurality of positive sample image combinations in the first training round, the second training round being a previous training round of the first training round; determine first target distribution relationship data by using the target statistical value corresponding to the plurality of positive sample image combinations in the first training round as a mean value and a second preset value as a standard deviation; and determine the loss value of the feature extraction model according to a difference between the first distribution relationship data and the first target distribution relationship data.

In another possible implementation, the first loss value determining unit is configured to determine second distribution relationship data according to the similarities of the plurality of negative sample image combinations, the second distribution relationship data representing a distribution of the similarities of the plurality of negative sample image combinations; obtain a mean value of the similarities of the plurality of negative sample image combinations to obtain an original statistical value corresponding to the plurality of negative sample image combinations; subtract a first preset value from the original statistical value to obtain a target statistical value corresponding to the plurality of negative sample image combinations; determine second target distribution relationship data by using the target statistical value as a mean value and a second preset value as a standard deviation; and determine the loss value of the feature extraction model according to a difference between the second distribution relationship data and the second target distribution relationship data.

In another possible implementation, the first loss value determining unit is configured to determine second distribution relationship data according to similarities of a plurality of negative sample image combinations in a first training round, the second distribution relationship data representing a distribution of the similarities of the plurality of negative sample image combinations, and sample hand images used in a plurality of training rounds of the feature extraction model being different; obtain a mean value of the similarities of the plurality of negative sample image combinations in the first training round to obtain an original statistical value corresponding to the plurality of negative sample image combinations; subtract a first preset value from a target statistical value corresponding to a plurality of negative sample image combinations in a second training round, to obtain a target statistical value corresponding to the plurality of negative sample image combinations in the first training round, the second training round being a previous training round of the first training round; determine second target distribution relationship data by using the target statistical value corresponding to the plurality of negative sample image combinations in the first training round as a mean value and a second preset value as a standard deviation; and determine the loss value of the feature extraction model according to a difference between the second distribution relationship data and the second target distribution relationship data.

In another possible implementation, in a case that the sample palm print features are obtained by performing feature extraction on each sample palm image, the loss value determining module further includes:
  a feature classification unit, configured to classify the sample palm print features of the sample palm images to obtain a predicted user identifier of each sample palm image; and
  a second loss value determining unit, configured to determine the loss value of the feature extraction model according to a difference between predicted user identifiers of the plurality of sample palm images and the sample user identifiers of the plurality of sample palm images.

In another possible implementation, the palm extraction module is further configured to:
  call a palm extraction model to perform palm extraction on each sample hand image to obtain the sample palm images of the plurality of sample user identifiers.

Figure 26:
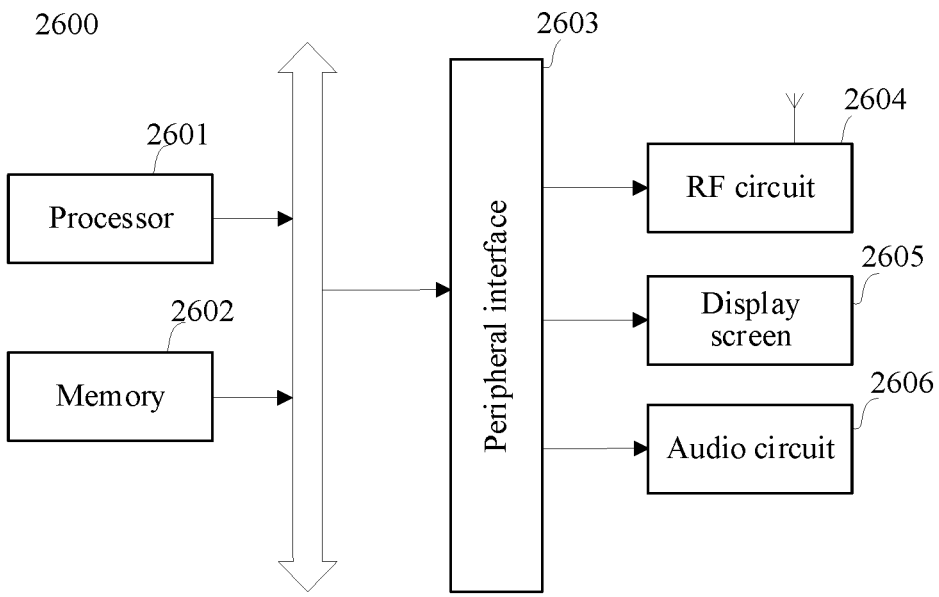
FIG. 26 is a schematic structural diagram of a terminal according to an embodiment of this disclosure.

FIG. 26 is a schematic structural diagram of a terminal according to an embodiment of this disclosure. The terminal can implement the operations performed by the computer device in the foregoing embodiments. The terminal 2600 may be a portable mobile terminal, for example: a smartphone, a tablet computer, a Moving Picture Experts Group Audio Layer III (MP3) player, a Moving Picture Experts Group Audio Layer IV (MP4) player, a notebook computer, a desktop computer, a head-mounted device, a smart TV, a smart speaker, a smart remote control, a smart microphone, or any another smart terminal. The terminal 2600 may be alternatively referred to as user equipment, a portable terminal, a laptop terminal, a desktop terminal, or by another name.

Generally, the terminal 2600 includes a processor 2601 and a memory 2602.

The processor 2601 may include one or more processing cores, for example, a 4-core processor or an 8-core processor. The memory 2602 may include one or more non-transitory computer-readable storage media. The non-transitory computer-readable storage media may be non-transitory and configured to be executed by the processor 2601 to implement the palm print recognition method provided in the method embodiments of this disclosure.

In some embodiments, the terminal 2600 may optionally include a peripheral interface 2603 and at least one peripheral. The peripheral includes: at least one of a radio frequency (RF) circuit 2604, a display screen 2605, and an audio circuit 2606.

Figure 27:
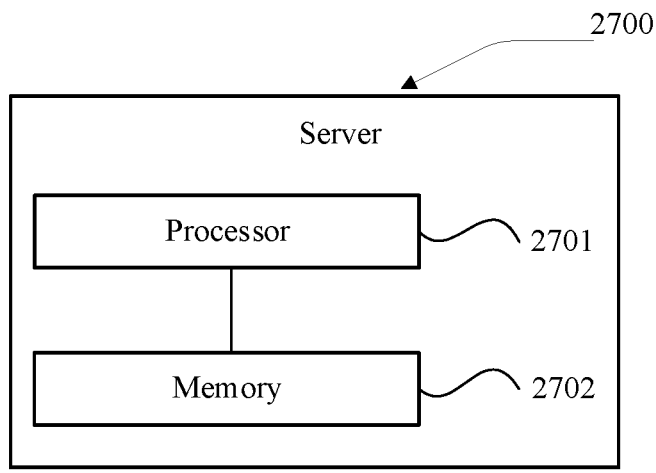
FIG. 27 is a schematic structural diagram of a server according to an embodiment of this disclosure.

FIG. 27 is a schematic structural diagram of a server according to an embodiment of this disclosure. The server 2700 may vary greatly due to different configurations or performance, and may include one or more processors (such as CPUs) 2701 and one or more memories 2702. The memory 2502 stores at least one instruction, the at least one instruction being loaded and executed by the processor 2701 to implement the methods provided in the foregoing method embodiments. Certainly, the server may also have a wired or wireless network interface, a keyboard, an input/output interface and other components to facilitate input/output. The server may also include other components for implementing device functions. Details are not described herein again.

The server 2700 may be configured to perform the operations performed by the computer device in the foregoing palm print recognition method.

An embodiment of this disclosure further provides a computer device, including a processor and a memory, the memory storing at least one instruction, the at least one instruction being loaded and executed by the processor to implement the palm print recognition method according to the foregoing embodiments, or implement the method for training a feature extraction model according to the foregoing embodiments.

An embodiment of this disclosure further provides a non-transitory computer-readable storage medium. The non-transitory computer-readable storage medium stores at least one instruction, the at least one instruction being loaded and executed by the processor to implement the palm print recognition method or the method for training a feature extraction model according to the foregoing embodiments, or implement the method for training a feature extraction model according to the foregoing embodiments.

An embodiment of this disclosure further provides a computer program product or a computer program. The computer program product or the computer program includes at least one instruction, the at least one instruction being stored in a non-transitory computer-readable storage medium. The at least one instruction is loaded and executed by the processor to implement the palm print recognition method or the method for training a feature extraction model according to the foregoing embodiments, or implement the method for training a feature extraction model according to the foregoing embodiments.

A person of ordinary skill in the art may understand that all or part of the steps of implementing the foregoing embodiments may be implemented by hardware, or may be implemented by a program instructing related hardware. The program may be stored in a non-transitory computer-readable storage medium. The non-transitory storage medium mentioned above may be a read-only memory, a magnetic disk, or an optical disc.

The foregoing descriptions are merely optional embodiments of the embodiments of this disclosure, but are not intended to limit the embodiments of this disclosure. Any modification, equivalent replacement, or improvement made within the spirit and principle of the embodiments of this disclosure shall fall within the protection scope of this application.

What is claimed is:

1. A method for training a feature extraction model, performed by a computer device, the method comprising:
    obtaining sample hand images for each of a plurality of sample user identifiers, at least two of the sample hand images associated with the each of the plurality of sample user identifier being acquired from different types of image acquisition devices having different image acquisition characteristics, wherein a first sample hand image acquired from a first type of the image acquisition device in the at least two of the sample hand images has a higher resolution than a second sample hand image for the same palm region in the first sample image acquired from a second type of the image acquisition device in the at least two of the sample hand images;
    calling a feature extraction model to extract sample palm print features of the plurality of sample user identifiers based on each sample hand image;
    determining a loss value of the feature extraction model according to the sample palm print features of the plurality of sample user identifiers; and
    training the feature extraction model according to the sample hand images acquired from different types of the image acquisition devices having different image acquisition characteristics and the loss value, and
    wherein the feature extraction model is trained to reduce the loss value to improve an accuracy of the feature extraction model obtaining palm print features and improve determination of user identifiers.

2. The method according to claim 1, wherein calling the feature extraction model to extract the sample palm print features of the plurality of sample user identifiers comprises:
    performing palm extraction on the each sample hand image to obtain a corresponding sample palm image; and
    calling the feature extraction model to perform feature extraction on each sample palm image, to obtain a sample palm print feature of each sample palm image.

3. The method according to claim 2, wherein before determining the loss value of the feature extraction model according to the sample palm print features of the plurality of sample user identifiers, the method further comprises:
    generating a plurality of positive sample image combinations and a plurality of negative sample image combinations according to sample palm images of the plurality of sample user identifiers, the positive sample image combination comprising two sample palm images belonging to a same sample user identifier, and the negative sample image combination comprising two sample palm images respectively belonging to different sample user identifiers; and
    determining the loss value of the feature extraction model according to the sample palm print features of the plurality of sample user identifiers comprises:
    obtaining a similarity of each positive sample image combination and a similarity of each negative sample image combination according to the obtained sample palm print features of the plurality of sample palm images, the similarity of the positive sample image combination representing a similarity between sample palm print features of two sample palm images in the positive sample image combination, and the similarity of the negative sample image combination representing a similarity between sample palm print features of two sample palm images in the negative sample image combination; and
    determining the loss value of the feature extraction model according to similarities of the plurality of positive sample image combinations and similarities of the plurality of negative sample image combinations.

4. The method according to claim 3, wherein determining the loss value of the feature extraction model according to the similarities of the plurality of positive sample image combinations and the similarities of the plurality of negative sample image combinations comprises:
    performing statistics on the similarities of the plurality of positive sample image combinations to obtain a first statistical value corresponding to the plurality of positive sample image combinations;

performing statistics on the similarities of the plurality of negative sample image combinations to obtain a second statistical value corresponding to the plurality of negative sample image combinations; and determining a difference between the second statistical value and the first statistical value as the loss value of the feature extraction model.

5. The method according to claim 3, wherein determining the loss value of the feature extraction model according to the similarities of the plurality of positive sample image combinations and the similarities of the plurality of negative sample image combinations comprises:

determining first distribution relationship data according to the similarities of the plurality of positive sample image combinations, the first distribution relationship data representing a distribution of the similarities of the plurality of positive sample image combinations;

obtaining a mean value of the similarities of the plurality of positive sample image combinations to obtain an original statistical value corresponding to the plurality of positive sample image combinations;

adding a first preset value to the original statistical value to obtain a target statistical value corresponding to the plurality of positive sample image combinations;

determining first target distribution relationship data by using the target statistical value as a mean value and a second preset value as a standard deviation; and determining the loss value of the feature extraction model according to a difference between the first distribution relationship data and the first target distribution relationship data.

6. The method according to claim 3, wherein determining the loss value of the feature extraction model according to the similarities of the plurality of positive sample image combinations and the similarities of the plurality of negative sample image combinations comprises:

determining first distribution relationship data according to the similarities of a plurality of positive sample image combinations in a current training round, the first distribution relationship data representing a distribution of the similarities of the plurality of positive sample image combinations, and sample hand images used in a plurality of training rounds of the feature extraction model being different;

calculating a mean value of the similarities of the plurality of positive sample image combinations in the current training round to obtain an original statistical value corresponding to the plurality of positive sample image combinations;

adding a first preset value to a target statistical value corresponding to a plurality of positive sample image combinations in a previous training round of the current training round, to obtain a target statistical value corresponding to the plurality of positive sample image combinations in the current training round;

determining first target distribution relationship data by using the target statistical value corresponding to the plurality of positive sample image combinations in the current training round as a mean value and a second preset value as a standard deviation; and determining the loss value of the feature extraction model according to a difference between the first distribution relationship data and the first target distribution relationship data.

7. The method according to claim 3, wherein determining the loss value of the feature extraction model according to the similarities of the plurality of positive sample image combinations and the similarities of the plurality of negative sample image combinations comprises:

determining second distribution relationship data according to the similarities of the plurality of negative sample image combinations, the second distribution relationship data representing a distribution of the similarities of the plurality of negative sample image combinations;

obtaining a mean value of the similarities of the plurality of negative sample image combinations to obtain an original statistical value corresponding to the plurality of negative sample image combinations;

subtracting a first preset value from the original statistical value to obtain a target statistical value corresponding to the plurality of negative sample image combinations;

determining second target distribution relationship data by using the target statistical value as a mean value and a second preset value as a standard deviation; and determining the loss value of the feature extraction model according to a difference between the second distribution relationship data and the second target distribution relationship data.

8. The method according to claim 3, wherein determining the loss value of the feature extraction model according to the similarities of the plurality of positive sample image combinations and the similarities of the plurality of negative sample image combinations comprises:

determining second distribution relationship data according to the similarities of a plurality of negative sample image combinations in a current training round, the second distribution relationship data representing a distribution of the similarities of the plurality of negative sample image combinations, and sample hand images used in a plurality of training rounds of the feature extraction model being different;

calculating a mean value of the similarities of the plurality of negative sample image combinations in the current training round to obtain an original statistical value corresponding to the plurality of negative sample image combinations;

subtracting a first preset value from a target statistical value corresponding to a plurality of negative sample image combinations in a previous training round of the current training round, to obtain a target statistical value corresponding to the plurality of negative sample image combinations in the current training round;

determining second target distribution relationship data by using the target statistical value corresponding to the plurality of negative sample image combinations in the current training round as a mean value and a second preset value as a standard deviation; and determining the loss value of the feature extraction model according to a difference between the second distribution relationship data and the second target distribution relationship data.

9. The method according to claim 2, wherein determining the loss value of the feature extraction model according to the sample palm print features of the plurality of sample user identifiers comprises:

classifying the sample palm print feature of each sample palm image to obtain a predicted user identifier of the each sample palm image; and determining the loss value of the feature extraction model according to a difference between the predicted user identifier of the each sample palm image and the sample user identifier of the each sample palm images.

10. The method according to claim 2, wherein performing palm extraction on the each sample hand image to obtain the corresponding sample palm image comprises:

calling a palm extraction model to perform palm extraction on the each sample hand image to obtain the corresponding sample palm images.

11. A palm print recognition method, performed by a computer device, the palm print recognition method comprising:

obtaining a target hand image, the target hand image comprising a palm;

calling a feature extraction model to perform feature extraction according to the target hand image, to obtain a target palm print feature, the feature extraction model being obtained through training according to sample palm print features of a plurality of sample user identifiers, each sample user identifier comprising a plurality of sample palm print features, the plurality of sample palm print features being obtained by respectively performing feature extraction on a plurality of corresponding sample hand images of the sample user identifier, and at least two of the sample hand images of a same sample user identifier being acquired by using different types of image acquisition devices having different image acquisition characteristics, wherein a first sample hand image acquired from a first type of the image acquisition device in the at least two of the sample hand images has a higher resolution than a second sample hand image for the same palm region in the first sample hand image acquired from a second type of the image acquisition device in the at least two of the sample hand images, the feature extraction model being trained according to the sample hand images acquired from different types of the image acquisition devices having different image acquisition characteristics and a loss value, the loss value being determined according to the sample palm print features of the plurality of sample user identifiers, wherein the feature extraction model is trained to reduce the loss value to improve an accuracy of the feature extraction model obtaining palm print features and improve determination of user identifiers; and performing recognition processing on the target palm print feature according to a plurality of preset palm print features stored and user identifiers corresponding to the preset palm print features, to determine a target user identifier of the target palm print feature.

12. A device comprising a memory for storing computer instructions and a processor in communication with the memory, wherein, when the processor executes the computer instructions, the processor is configured to cause the device to:

obtain sample hand images for each of a plurality of sample user identifiers, at least two of the sample hand images associated with the each of the plurality of sample user identifier being acquired from different types of image acquisition devices having different image acquisition characteristics, wherein a first sample hand image acquired from a first type of the image acquisition device in the at least two of the sample hand images has a higher resolution than a second sample hand image for the same palm region in the first sample hand image acquired from a second type of the image acquisition device in the at least two of the sample hand images;

call a feature extraction model to extract sample palm print features of the plurality of sample user identifiers based on each sample hand image;

determine a loss value of the feature extraction model according to the sample palm print features of the plurality of sample user identifiers; and train the feature extraction model according to the sample hand images acquired from different types of the image acquisition devices having different image acquisition characteristics and the loss value, wherein the feature extraction model is trained to reduce the loss value to improve an accuracy of the feature extraction model obtaining palm print features and improve determination of user identifiers.

13. The device according to claim 12, wherein, when the processor is configured to cause the device to call the feature extraction model to extract the sample palm print features of the plurality of sample user identifiers, the processor is configured to cause the device to:

perform palm extraction on the each sample hand image to obtain a corresponding sample palm image; and call the feature extraction model to perform feature extraction on each sample palm image, to obtain a sample palm print feature of each sample palm image.

14. The device according to claim 13, wherein, before the processor is configured to cause the device to determine the loss value of the feature extraction model according to the sample palm print features of the plurality of sample user identifiers, the processor is configured to further cause the device to:

generate a plurality of positive sample image combinations and a plurality of negative sample image combinations according to sample palm images of the plurality of sample user identifiers, the positive sample image combination comprising two sample palm images belonging to a same sample user identifier, and the negative sample image combination comprising two sample palm images respectively belonging to different sample user identifiers; and determine the loss value of the feature extraction model according to the sample palm print features of the plurality of sample user identifiers comprises:

obtain a similarity of each positive sample image combination and a similarity of each negative sample image combination according to the obtained sample palm print features of the plurality of sample palm images, the similarity of the positive sample image combination representing a similarity between sample palm print features of two sample palm images in the positive sample image combination, and the similarity of the negative sample image combination representing a similarity between sample palm print features of two sample palm images in the negative sample image combination; and determine the loss value of the feature extraction model according to similarities of the plurality of positive sample image combinations and similarities of the plurality of negative sample image combinations.

15. The device according to claim 14, wherein, when the processor is configured to cause the device to determine the loss value of the feature extraction model according to the similarities of the plurality of positive sample image combinations and the similarities of the plurality of negative sample image combinations, the processor is configured to cause the device to:

perform statistics on the similarities of the plurality of positive sample image combinations to obtain a first statistical value corresponding to the plurality of positive sample image combinations;
perform statistics on the similarities of the plurality of negative sample image combinations to obtain a second statistical value corresponding to the plurality of negative sample image combinations; and
determine a difference between the second statistical value and the first statistical value as the loss value of the feature extraction model.

16. The device according to claim 14, wherein, when the processor is configured to cause the device to determine the loss value of the feature extraction model according to the similarities of the plurality of positive sample image combinations and the similarities of the plurality of negative sample image combinations, the processor is configured to cause the device to:
determine first distribution relationship data according to the similarities of the plurality of positive sample image combinations, the first distribution relationship data representing a distribution of the similarities of the plurality of positive sample image combinations;
obtain a mean value of the similarities of the plurality of positive sample image combinations to obtain an original statistical value corresponding to the plurality of positive sample image combinations;
add a first preset value to the original statistical value to obtain a target statistical value corresponding to the plurality of positive sample image combinations;
determine first target distribution relationship data by using the target statistical value as a mean value and a second preset value as a standard deviation; and
determine the loss value of the feature extraction model according to a difference between the first distribution relationship data and the first target distribution relationship data.

17. The device according to claim 14, wherein, when the processor is configured to cause the device to determine the loss value of the feature extraction model according to the similarities of the plurality of positive sample image combinations and the similarities of the plurality of negative sample image combinations, the processor is configured to cause the device to:
determine first distribution relationship data according to the similarities of a plurality of positive sample image combinations in a current training round, the first distribution relationship data representing a distribution of the similarities of the plurality of positive sample image combinations, and sample hand images used in a plurality of training rounds of the feature extraction model being different;
calculate a mean value of the similarities of the plurality of positive sample image combinations in the current training round to obtain an original statistical value corresponding to the plurality of positive sample image combinations;
add a first preset value to a target statistical value corresponding to a plurality of positive sample image combinations in a previous training round of the current training round, to obtain a target statistical value corresponding to the plurality of positive sample image combinations in the current training round;
determine first target distribution relationship data by using the target statistical value corresponding to the plurality of positive sample image combinations in the current training round as a mean value and a second preset value as a standard deviation; and
determine the loss value of the feature extraction model according to a difference between the first distribution relationship data and the first target distribution relationship data.

18. The device according to claim 14, wherein, when the processor is configured to cause the device to determine the loss value of the feature extraction model according to the similarities of the plurality of positive sample image combinations and the similarities of the plurality of negative sample image combinations, the processor is configured to cause the device to:
determine second distribution relationship data according to the similarities of the plurality of negative sample image combinations, the second distribution relationship data representing a distribution of the similarities of the plurality of negative sample image combinations;
obtain a mean value of the similarities of the plurality of negative sample image combinations to obtain an original statistical value corresponding to the plurality of negative sample image combinations;
subtract a first preset value from the original statistical value to obtain a target statistical value corresponding to the plurality of negative sample image combinations;
determine second target distribution relationship data by using the target statistical value as a mean value and a second preset value as a standard deviation; and
determine the loss value of the feature extraction model according to a difference between the second distribution relationship data and the second target distribution relationship data.

* * * * *